US012726628B2

(12) United States Patent
Zhang et al.

(10) Patent No.: US 12,726,628 B2

(45) Date of Patent: Sep. 1, 2026

(54) BI-DIRECTION OPTICAL FLOW SUBBLOCK REFINEMENT FOR AN AFFINE MODELED BLOCK

(71) Applicant: QUALCOMM Incorporated, San Diego, CA (US)

(72) Inventors: Zhi Zhang, Munich (DE); Vadim Seregin, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 69 days.

(21) Appl. No.: 18/818,235

(22) Filed: Aug. 28, 2024

(65) Prior Publication Data

US 2025/0080747 A1 Mar. 6, 2025

Related U.S. Application Data

(60) Provisional application No. 63/535,885, filed on Aug. 31, 2023.

(51) Int. Cl.

*H04N 19/137* (2014.01)
*H04N 19/159* (2014.01)
*H04N 19/176* (2014.01)

(52) U.S. Cl.

CPC ......... *H04N 19/137* (2014.11); *H04N 19/159* (2014.11); *H04N 19/176* (2014.11)

(58) Field of Classification Search

CPC ... H04N 19/137; H04N 19/159; H04N 19/176
USPC ..................................................... 375/240.02
See application file for complete search history.

(56) References Cited

U.S. PATENT DOCUMENTS 11,272,193 B2 * 3/2022 Lim ....................... H04N 19/52
2018/0152670 A1 * 5/2018 Zhou ....................... H04N 5/765
2020/0348796 A1 11/2020 Chou
2024/0357122 A1 * 10/2024 Chen ....................... H04N 19/52
2025/0119572 A1 * 4/2025 Lai ....................... H04N 19/463

OTHER PUBLICATIONS

Bross B., et al., "Versatile Video Coding Editorial Refinements on Draft 10," No. JVET-T2001-v2, Joint Video Experts Team (JVET) of ITU-T SG 16 WP 3 and ISO/IEC JTC 1/SC 29, 20th Meeting, by Teleconference, Oct. 7, 2020-Oct. 16, 2020, Nov. 24, 2020, XP030293334, pp. 1-515.

(Continued)

*Primary Examiner* — Mainul Hasan
*Assistant Examiner* — Richard B Carter
(74) *Attorney, Agent, or Firm* — Shumaker & Sieffert. P.A

(57) ABSTRACT

A video decoder may be configured to derive an initial motion vector for a current block of video data; determine whether to apply multi-iterative bi-directional optical flow (BDOF) or one-pass BDOF to the initial motion vector based on a size of the current block; in response to determining to apply the one-pass BDOF to the initial motion vector, determine a modified motion vector for the current block using the one-pass BDOF; determine a prediction block, for the current block, corresponding to the modified motion vector; and use the prediction block to determine a decoded version of the current block.

30 Claims, 20 Drawing Sheets

(56) References Cited

OTHER PUBLICATIONS

Chen J., et al., "Algorithm Description for Versatile Video Coding and Test Model 11 (VTM 11)," JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-102.
Coban M., et al., "Algorithm Description of Enhanced Compression Model 10 (ECM 10)," JVET-AE2025, JVET-AE2025-v1, Joint Video Experts Team (JVET) of ITU-T SG 16 WP 3 and ISO/IEC JTC 1/SC 29, 31st Meeting, Geneva, CH, Jul. 11-19, 2023, pp. 1-83, Oct. 29, 2023, XP030313627, the whole document.
Coban M., et al., "Algorithm Description of Enhanced Compression Model 6 (ECM 6)," JVET-AA2025, Joint Video Experts Team (JVET) of ITU-T SG 16 WP 3 and ISO/IEC JTC 1/SC 29 27th Meeting, by Teleconference, Jul. 13-22, 2022, pp. 1-54, JVET-AA2025-v1.
Co-pending U.S. Appl. No. 18/469,863, inventor Bangalore Ravi; Kiran, filed on Sep. 19, 2023.
Co-pending U.S. Appl. No. 18/754,788, inventor Zhang; Zhi, filed on Jun. 26, 2024.
Co-pending U.S. Appl. No. 18/755,388, inventor Chen; Chun-Chi, filed on Jun. 26, 2024.
International Search Report and Written Opinion—PCT/US2024/044343—ISA/EPO—Nov. 19, 2024 12 Pages.
ITU-T H.265: "Series H: Audiovisual and Multimedia Systems Infrastructure of Audiovisual Services—Coding of Moving Video," High Efficiency Video Coding, The International Telecommunication Union, Jun. 2019, 696 Pages.
ITU-T H.266: "Series H: Audiovisual and Multimedia Systems Infrastructure of Audiovisual Services—Coding of Moving Video," Versatile Video Coding, The International Telecommunication Union, Aug. 2020, 516 pages.
Karczewicz M., et al., "Common Test Conditions and Evaluation Procedures for Enhanced Compression Tool Testing," JVET-AE2017-v1, Joint Video Experts Team (JVET) of ITU-T SG 16 WP 3 and ISO/IEC JTC 1/SC 29, 31st Meeting, Geneva, CH, Jul. 11-19, 2023, pp. 1-12.
Salehifar M (Bytedance Inc)., et al., "EE2-Related: On Iterative BDOF and EE2-2.6 Improvement," Joint Video Experts Team (JVET) of ITU-T SG 16 WP 3 and ISO/IEC JTC 1/SC 29, 30th Meeting, Antalya, TR, Apr. 21, 2023-Apr. 28, 2023, No. JVET-AD0196, m62878, Apr. 14, 2023, XP030308953, 3 pages, the whole document.
Sullivan G.J., et al., "Overview of the High Efficiency Video Coding (HEVC) Standard," IEEE Transactions on Circuits and Systems for Video Technology, IEEE Service Center, Piscataway, NJ, US, vol. 22, No. 12, Dec. 1, 2012, XP055045358, XP011487803, pp. 1649-1668, Jan. 1, 2012, pp. 1-1.
Wang Y-K., et al., "High Efficiency Video Coding (HEVC) Defect Report," JCTVC-N1003_v1, Joint Collaborative Team on Video Coding (JCT-VC) of ITU-T SG 16 WP 3 and ISO/IEC JTC 1/SC 29/WG 11 14th Meeting: Vienna, AT, Jul. 25- Aug. 2, 2013, 311 Pages.
Xiu X., et al., "CE9-Related: A Simplified Design of Bi-Directional Optical Flow (BIO)," Joint Video Experts Team (JVET) of ITU-T SG 16 WP 3 and ISO/IEC JTC 1/SC 29/WG 11, No. JVET-L0591, 12th Meeting: Macao, CN, Oct. 3, 2018-Oct. 12, 2018, Oct. 5, 2018, XP030194913, pp. 1-9, the whole document.
Zhang Y., et al., "EE2-2.1: Regression Based Affine Candidate Derivation," JVET-AA0107-v2, Joint Video Experts Team (JVET) of ITU-T SG 16 WP 3 and ISO/IEC JTC 1/SC 29, 27th Meeting, by teleconference, Jul. 13-22, 2022, pp. 1-5.
Zhang Z., et al., "EE2-3.6: Affine Subblock BDOF Refinement," JVET-AF0159-v2, Joint Video Experts Team (JVET) of ITU-T SG 16 WP 3 and ISO/IEC JTC 1/SC 29 32nd Meeting, Hannover, DE, Oct. 13-20, 2023, pp. 1-3.
Zhang Z (Qualcomm Incorporated)., et al., "EE2-3.6: Affine Subblock BDOF Refinement," Joint Video Experts Team (JVET) of ITU-T SG 16 WP 3 and ISO/IEC JTC 1/SC 29, 32nd Meeting, Hannover, DE, Oct. 13, 2023-Oct. 20, 2023, No. JVET-AF0159-v1, Oct. 6, 2023, XP030312286, 3 pages, the whole document.
Zhang Z (Qualcomm Incorporated)., et al., "Non-EE2: Affine Subblock BDOF Refinement," Joint Video Experts Team (JVET) of ITU-T SG 16 WP 3 and ISO/IEC JTC 1/SC 29, 31st Meeting, Geneva, CH, Jul. 11, 2023-Jul. 19, 2023, No. JVET-AE0148-v2, Jul. 13, 2023, XP030311440, 3 pages, the whole document.

* cited by examiner

BI-DIRECTION OPTICAL FLOW SUBBLOCK REFINEMENT FOR AN AFFINE MODELED BLOCK

This application claims the benefit of U.S. Provisional Patent Application No. 63/535,885, filed 31 Aug. 2023, the entire contents of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

The techniques of this disclosure are related to decoder-side motion vector derivation techniques generally (e.g., template matching, bilateral matching, decoder-side MV refinement, bi-directional optical flow (BDOF)) and to BDOF more specifically. Video coders typically apply multiple passes of BDOF to a block to determine a refined motion vector that produces a potentially better prediction block, e.g., a prediction block more similar to the corresponding original block of the video data. For example, as explained in more detail below, in a first pass, a video decoder may search a first sub-region for a modified motion vector that minimizes a bilateral matching cost between two reference blocks in different reference pictures to determine a first modified motion vector. For a second pass, the video coder may search a different, e.g., smaller, sub-region around the prediction block of the first modified motion vector for a second modified motion vector that minimizes a bilateral matching cost between two reference blocks in different reference pictures. In some examples, the video coder may perform up to four passes, with each pass improving the quality of the motion vector, e.g., the quality of the prediction block. The four passes may, for example, include two passes of motion vector searching based on minimizing bilateral matching cost between two reference blocks in different reference pictures and two additional passes of applying BDOF to a block to determine a refined motion vector. For blocks with certain characteristics, however, the multiple passes may introduce additional computation complexity into a video coding process without producing a commensurate improvement in the quality of motion vectors.

According to the techniques of this disclosure, a video coder may be configured to determine whether to apply multi-iterative BDOF or one-pass BDOF to the initial motion vector based on a size of the current block. By determining whether to apply multi-iterative BDOF or one-pass BDOF to the initial motion vector based on a size of the current block, a video coder may utilize multi-iterative BDOF in coding scenarios where multi-iterative BDOF improves the quality of prediction and perform one-pass BDOF for coding scenarios where multi-iterative BDOF does not significantly improve the quality of prediction. By performing one-pass BDOF for coding scenarios where multi-iterative BDOF does not significantly improve the quality of prediction, the computational complexity of the video coding may be reduced in a manner that does not meaningfully affect coding quality. Reducing computational complexity potentially reduces latency, improves battery life in battery powered devices, and results in other improvements to device function.

According to an example of this disclosure, a method of decoding video data includes deriving an initial motion vector for a current block of the video data; determining to apply one-pass bi-directional optical flow (BDOF) based on a size of the current block; in response to determining to apply the one-pass BDOF to the initial motion vector, determining a modified motion vector for the current block using the one-pass BDOF; determining a prediction block, for the current block, corresponding to the modified motion vector; and using the prediction block to determine a decoded version of the current block.

According to an example of this disclosure, a device for decoding video data includes a memory configured to store video data; one or more processors implemented in circuitry and configured to derive an initial motion vector for a current block of the video data; determine to apply one-pass bi-directional optical flow (BDOF) to the initial motion vector based on a size of the current block; in response to determining to apply the one-pass BDOF to the initial motion vector, determine a modified motion vector for the current block using the one-pass BDOF; determine a prediction block, for the current block, corresponding to the modified motion vector; and use the prediction block to determine a decoded version of the current block.

A computer-readable storage medium stores instructions that when executed by one or more processors cause the one or more processors to derive an initial motion vector for a current block of video data; determine to apply one-pass BDOF to the initial motion vector based on a size of the current block; in response to determining to apply the one-pass BDOF to the initial motion vector, determine a modified motion vector for the current block using the one-pass BDOF; determine a prediction block, for the current block, corresponding to the modified motion vector; and use the prediction block to determine a decoded version of the current block.

According to an example of this disclosure, a device for encoding video data includes a memory configured to store video data; one or more processors implemented in circuitry and configured to derive an initial motion vector for a current block of the video data; determine to apply one-pass bi-directional optical flow (BDOF) to the initial motion vector based on a size of the current block; in response to determining to apply the one-pass BDOF to the initial motion vector, determine a modified motion vector for the current block using the one-pass BDOF; determine a prediction block, for the current block, corresponding to the modified motion vector; use the prediction block to determine a decoded version of the current block; store, in a decoded picture buffer, a copy of a decoded picture of video data that includes the decoded version of the current block; and predict a subsequent block of the video data using the stored copy of the decoded picture of the video data.

According to an example of this disclosure, a method of encoding video data includes deriving an initial motion vector for a current block of the video data; determining to apply one-pass bi-directional optical flow (BDOF) to the initial motion vector based on a size of the current block; in response to determining to apply the one-pass BDOF to the initial motion vector, determining a modified motion vector for the current block using the one-pass BDOF; determining a prediction block, for the current block, corresponding to the modified motion vector; using the prediction block to determine a decoded version of the current block; storing, in a decoded picture buffer, a copy of a decoded picture of video data that includes the decoded version of the current block; and predicting a subsequent block of the video data using the stored copy of the decoded picture of the video data.

The details of one or more examples are set forth in the accompanying drawings and the description below. Other features, objects, and advantages will be apparent from the description, drawings, and claims.

DETAILED DESCRIPTION

Figure 1:
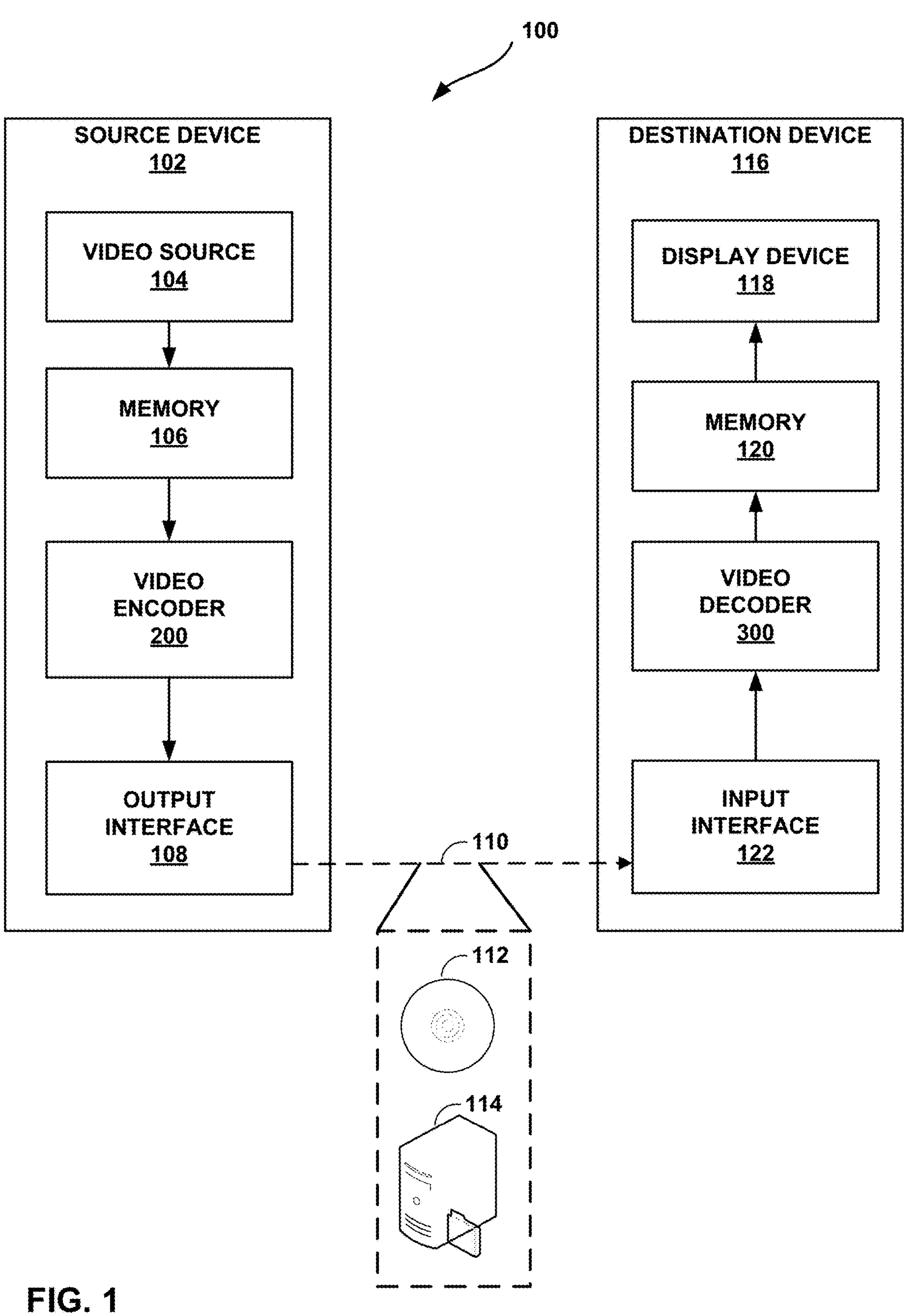
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

The techniques of this disclosure are related to decoder-side motion vector derivation techniques generally (e.g., template matching, bilateral matching, decoder-side MV refinement, bi-directional optical flow (BDOF)) and to BDOF more specifically. Video coders typically apply multiple passes of BDOF to a block to determine a refined motion vector that produces a potentially better prediction block, e.g., a prediction block more similar to the corresponding original block of the video data. For example, as explained in more detail below, in a first pass, a video decoder may search a first sub-region for a modified motion vector that minimizes a bilateral matching cost between two reference blocks in different reference pictures to determine a first modified motion vector. For a second pass, the video coder may search a different, e.g., smaller, sub-region around the prediction block of the first modified motion vector for a second modified motion vector that minimizes a bilateral matching cost between two reference blocks in different reference pictures. In some examples, the video coder may perform up to four passes, with each pass improving the quality of the motion vector, e.g., the quality of the prediction block. The four passes may, for example, include two passes of motion vector searching based on minimizing bilateral matching cost between two reference blocks in different reference pictures and two additional passes of applying BDOF to a block to determine a refined motion vector. For blocks with certain characteristics, however, the multiple passes may introduce additional computation complexity into a video coding process without producing a commensurate improvement in the quality of motion vectors.

According to the techniques of this disclosure, a video coder may be configured to determine whether to apply multi-iterative BDOF or one-pass BDOF to the initial motion vector based on a size of the current block. By determining whether to apply multi-iterative BDOF or one-pass BDOF to the initial motion vector based on a size of the current block, a video coder may utilize multi-iterative BDOF in coding scenarios where multi-iterative BDOF improves the quality of prediction and perform one-pass BDOF for coding scenarios where multi-iterative BDOF does not significantly improve the quality of prediction. By performing one-pass BDOF for coding scenarios where multi-iterative BDOF does not significantly improve the quality of prediction, the computational complexity of the video coding may be reduced in a manner that does not meaningfully affect coding quality. Reducing computational complexity potentially reduces latency, improves battery life in battery powered devices, and results in other improvements to device function.

The techniques may be applied in conjunction with any of the existing video codecs, such as High Efficiency Video Coding (HEVC), Versatile Video Coding (VVC), Essential Video Coding (EVC), or be an efficient coding tool in any future video coding standards. Unless otherwise stated, it should be assumed that the techniques described herein may be performed by either a video encoder or video decoder. Some aspects of the disclosure will be described with respect to only a video decoder, but it should be understood that in many cases such techniques may also be performed by the video decoding loop of a video encoder or other aspects of a video encoder.

As used in this disclosure, the term video coding generically refers to either video encoding or video decoding. Similarly, the term video coder may generically refer to a video encoder or a video decoder. Moreover, certain techniques described in this disclosure with respect to video decoding may also apply to video encoding, and vice versa. For example, often times video encoders and video decoders are configured to perform the same process, or reciprocal processes. Also, a video encoder typically performs video decoding, also called reconstruction, as part of the processes of determining how to encode video data. For example, a video encoder may perform deblocking filtering on decoded video blocks in order to determine whether a certain encoding scheme produces a desirable rate-distortion tradeoff and also so that the video encoder can perform motion estimation using the same blocks available to a video decoder when the video decoder performs motion compensation.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (e.g., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for decoder-side motion vector derivation (e.g., BDOF). Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for decoder-side motion vector derivation, such as BDOF. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (e.g., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data.

Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively.

Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder (e.g., audio codec), and may include appropriate MUX-DEMUX units, or other hardware and/or software, to handle multiplexed streams including both audio and video in a common data stream. Example audio codecs may include AAC, AC-3, AC-4, ALAC, ALS, AMBE, AMR, AMR-WB (G.722.2), AMR-WB+, aptx (various versions), ATRAC, BroadVoice (BV16, BV32), CELT, Enhanced AC-3 (E-AC-3), EVS, FLAC, G.711, G.722, G.722.1, G.722.2 (AMR-WB). G.723.1, G.726, G.728, G.729, G.729.1, GSM-FR, HE-AAC, iLBC, iSAC, LA Lyra, Monkey's Audio, MP1, MP2 (MPEG-1, 2 Audio Layer II), MP3, Musepack, Nellymoser Asao, OptimFROG, Opus, Sac, Satin, SBC, SILK, Siren 7, Speex, SVOPC, True Audio (TTA), TwinVQ, USAC, Vorbis (Ogg), WavPack, and Windows Media Aud.

Video encoder 200 and video decoder 300 each may be implemented as any of a variety of suitable encoder and/or decoder circuitry that includes a processing system, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as HEVC or extensions thereto, such as the multi-view and/or scalable video coding extensions. Alternatively, video encoder 200 and video decoder 300 may operate according to other proprietary or industry standards, such as ITU-T H.266, also referred to as VVC. In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use decoder-side motion vector derivation.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block.

Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

As introduced above, video encoder 200 and video decoder 300 may be configured to perform motion vector prediction. In HEVC, there are two inter prediction modes, named merge (skip is considered as a special case of merge) and AMVP modes, respectively, for a PU. In AMVP and merge mode, video encoder 200 and video decoder 300 maintain a motion vector (MV) candidate list for multiple motion vector predictors. The motion vector(s), as well as reference indices in the merge mode, of the current PU are generated by selecting one candidate from the MV candidate list.

In the implementation of HEVC, the MV candidate list contains up to five candidates for the merge mode and two candidates for the AMVP mode. A merge candidate may contain a set of motion information, e.g., motion vectors corresponding to both reference picture lists (list 0 and list 1) and the reference indices. By receiving a merge candidate identified by a merge index, video decoder 300 determines the reference pictures used for the prediction of the current blocks, as well as the associated motion vectors. On the other hand, under AMVP mode for each potential prediction direction from either list 0 or list 1, video decoder 300 receives a MV predictor (MVP) index to the MV candidate list because the AMVP candidate contains only a motion vector. Video decoder 300 additionally receives a motion vector difference (MVD) and a reference index to explicitly identify a reference picture. In AMVP mode, the predicted motion vectors can be further refined.

The candidates for both modes are derived similarly from the same spatial and temporal neighboring blocks. In HEVC, video encoder 200 and video decoder 300 may derive spatial MV candidates from the neighboring blocks, as shown in FIG. 2A and FIG. 2B, for a specific PU ($PU_0$), although the techniques for generating the candidates from the blocks differ for merge and AMVP modes.

Figures 2A, 2B:
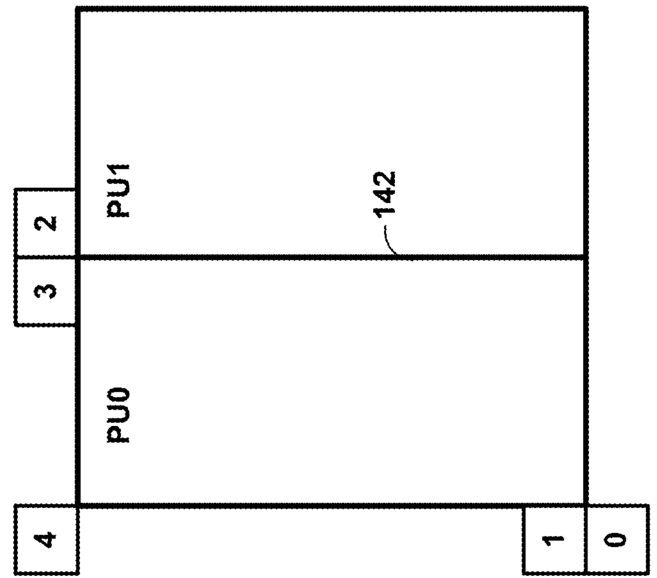
FIG. 2A is a conceptual diagram illustrating spatial neighboring motion vector candidates for merge mode.
FIG. 2B is a conceptual diagram illustrating spatial neighboring motion vector candidates for advanced motion vector prediction (AMVP) mode.

FIG. 2A is a conceptual diagram showing spatial neighboring candidates of block 140 for merge mode. FIG. 2B is a conceptual diagram showing spatial neighboring candidates of block 142 for AMVP mode. In merge mode, video encoder 200 and video decoder 300 may derive up to four spatial MV candidates in the order shown in FIG. 2A. The order is the following: a left block (0, A1), an above block (1, B1), an above-right block (2, B0), a below-left block (3, A0), and an above-left (4, B2) block.

In AMVP mode, video encoder 200 and video decoder 300 may divide the neighboring blocks into two groups: a left group including blocks 0 and 1, and an above group include blocks 2, 3, and 4, as shown in FIG. 2B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, video encoder 200 and video decoder 300 may scale the first available candidate to form the final candidate. Thus, the temporal distance differences can be compensated.

Temporal motion vector prediction in HEVC will now be discussed. Video encoder 200 and video decoder 300 may be configured to add a temporal motion vector predictor (TMVP) candidate, if enabled and available, into the MV candidate list after spatial motion vector candidates. The process of motion vector derivation for TMVP candidate is the same for both merge and AMVP modes. However, in HEVC, the target reference index for the TMVP candidate in the merge mode is set to 0.

Figure 3B:
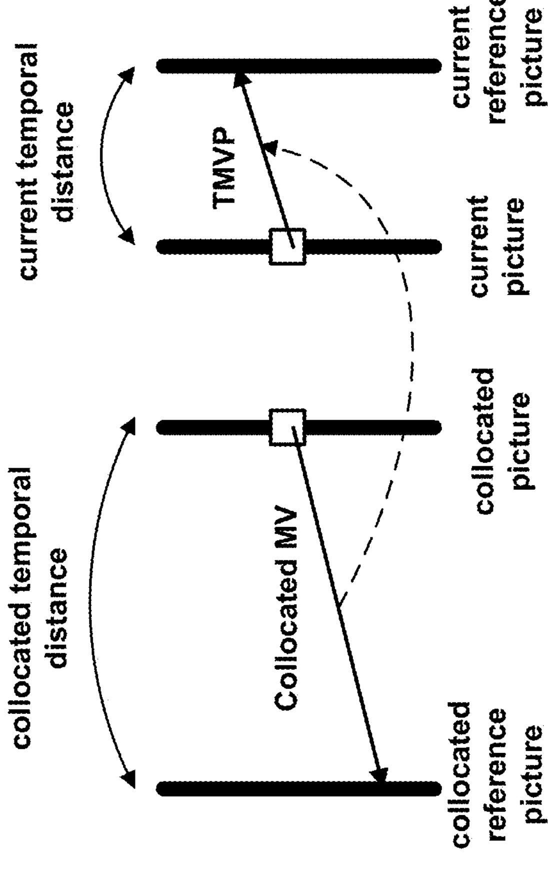
FIG. 3B shows an example motion vector scaling process.
Figure 3A:
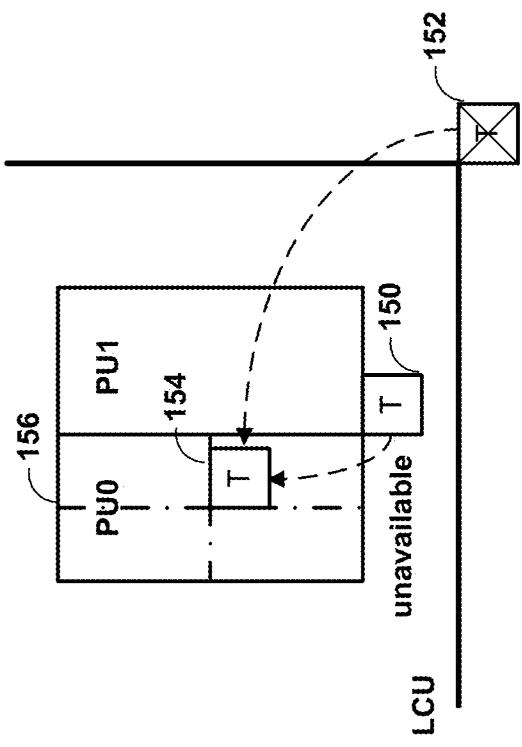
FIG. 3A shows an example temporal motion vector predictor (TMVP) candidate for a block.

FIG. 3A shows example TMVP candidates for block 154 (PUG) and FIG. 3B shows motion vector scaling process 156. The primary block location for TMVP candidate derivation is the bottom right block outside of the collocated PU. This candidate is shown in FIG. 3A as a block "T." The location of block T is used to compensate the bias to the above and left blocks used to generate spatial neighboring candidates. However, if that block is located outside of the current CTB row or motion information is not available, the block is substituted with a center block of the PU.

Video encoder 200 and video decoder 300 may derive a motion vector for the TMVP candidate from the co-located PU of the co-located picture, indicated in the slice level. The motion vector for the co-located PU is called a collocated MV. Similar to temporal direct mode in AVC, to derive the TMVP candidate motion vector, the co-located MV may be scaled to compensate the temporal distance differences, as shown in FIG. 3B.

Other Aspects of Motion Prediction in HEVC related to the techniques described herein will now be described. Video encoder 200 and video decoder 300 may be configured to perform motion vector scaling. It is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector to be predicted, the associated containing picture may be different than the reference picture. Therefore, video encoder 200 and video decoder 300 may calculate a new distance, based on POC. Video encoder 200 and video decoder 300 may scale the motion vector based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Video encoder 200 and video decoder 300 may be configured to perform artificial motion vector candidate generation. If a motion vector candidate list is not complete, artificial motion vector candidates are generated and inserted at the end of the list until the list is full.

In merge mode, there are two types of artificial MV candidates: combined candidate derived only for B-slices and zero candidates used only for AMVP if the first type does not provide enough artificial candidates. For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Video encoder 200 and video decoder 300 may be configured to perform a pruning process for candidate insertion. Candidates from different blocks may happen to be the same, which decreases the efficiency of a merge/AMVP candidate list. A pruning process is applied to solve this problem. When implementing the pruning process, video encoder 200 or video decoder 300 compares one candidate against the others in the current candidate list to avoid inserting identical candidate in certain extent. To reduce the complexity, only limited numbers of pruning process is applied instead of comparing each potential one with all the other existing ones.

Video encoder 200 and video decoder 300 may be configured to perform template matching prediction. Template matching prediction is a special merge mode based on Frame-Rate Up Conversion (FRUC) techniques. With this mode, partial motion information of a block is not signaled but derived at the decoder side. Template matching may be applied to both AMVP mode and regular merge mode. In AMVP mode, MVP candidate selection is determined based on template matching to pick up the one which reaches the minimal difference between current block template and reference block template. In regular merge mode, a template matching mode flag is signaled to indicate the use of template matching. Then, video encoder 200 and video decoder 300 may apply template matching to the merge candidate indicated by merge index for MV refinement.

Figure 4:
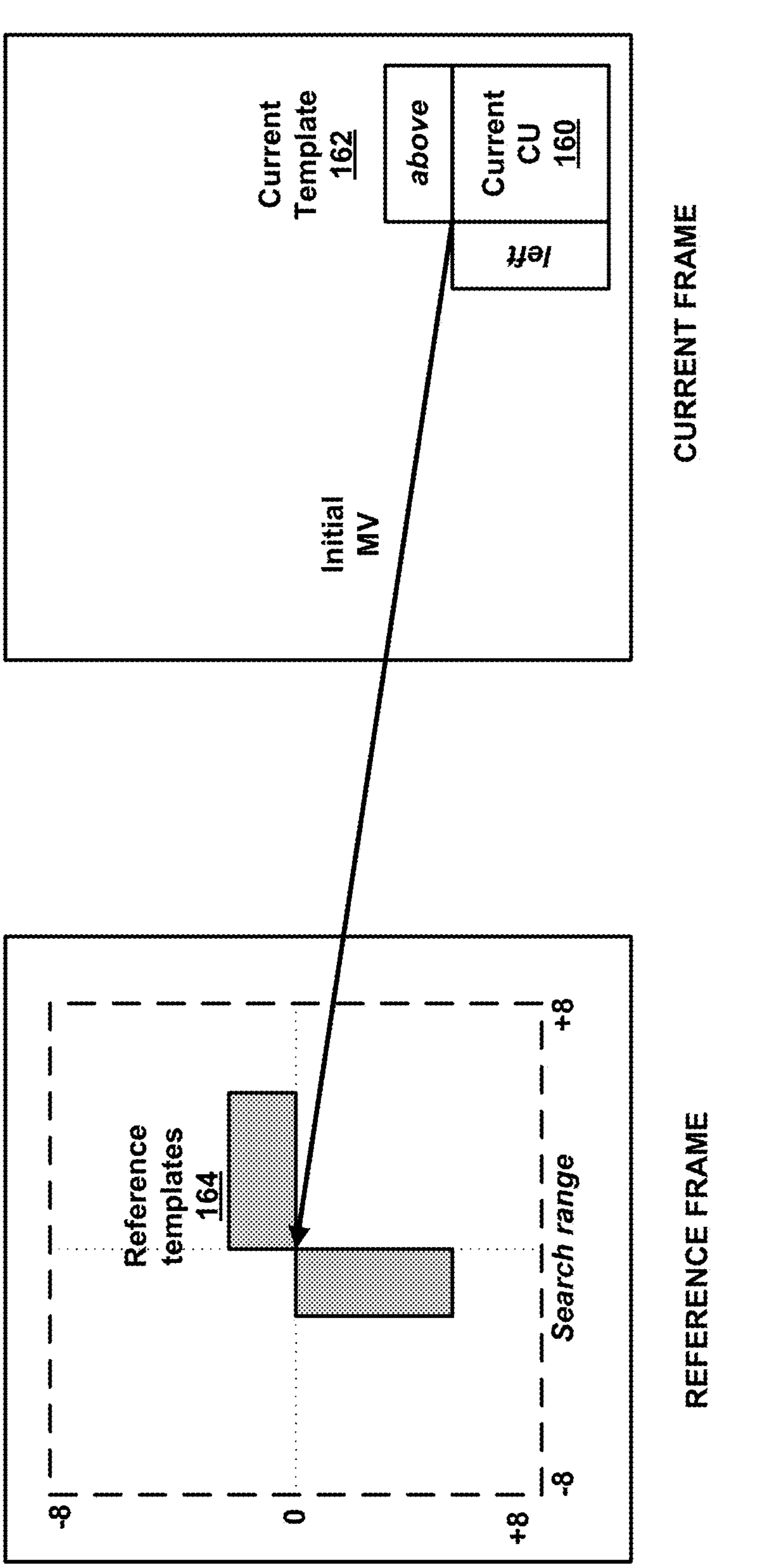
FIG. 4 is an illustration of an example template matching process.

As shown in FIG. 4, template matching is used to derive motion information of current CU 160 by finding the closest match between a current template 162 in the current picture and a reference template 164, which may be the same size as current template 162, in a reference picture. With an AMVP candidate selected based on initial matching error, video encoder 200 and video decoder 300 may refine the MVP using template matching. With a merge candidate indicated by signaled merge index, video encoder 200 and video decoder 300 may be configured to refine MVs corresponding to L0 and L1 independently by template matching and then further refine the less accurate MV based on the more accurate MV.

Video encoder 200 and video decoder 300 may be configured to implement a cost function. When a motion vector points to a fractional sample position, motion compensated interpolation is needed. To reduce complexity, bi-linear interpolation instead of regular 8-tap DCT-IF interpolation is used for both template matching to generate templates on reference pictures. The matching cost C of template matching is calculated as follows:

$$C = SAD + w \cdot (|MV_x - MV_x^s| + |MV_y - MV_y^s|)$$

where w is a weighting factor which is empirically set to 4, MV and $MV^s$ indicate the currently tested MV and the initial MV (i.e., a MVP candidate in AMVP mode or merged motion in merge mode), respectively. SAD is used as the matching cost for template matching.

When TM is used, motion may be refined by using luma samples only. The derived motion may be used for both luma and chroma for MC inter prediction. After MV is decided, final MC is performed using 8-taps interpolation filter for luma and 4-taps interpolation filter for chroma.

Video encoder 200 and video decoder 300 may be configured to implement a search process. MV refinement is a pattern based MV search with the criterion of template matching cost. two search patterns are supported—an diamond search and a cross search for MV refinement. The MV is directly searched at quarter luma sample MVD accuracy with diamond pattern, followed by quarter luma sample MVD accuracy with cross pattern, and then this is followed by one-eighth luma sample MVD refinement with cross pattern. The search range of MV refinement is set equal to (−8, +8) luma samples around the initial MV.

Video encoder 200 and video decoder 300 may be configured to perform bilateral matching prediction. Bilateral matching, also referred to as bilateral merge, (BM) prediction is another merge mode based on FRUC techniques. When applying BM mode to a block, video encoder 200 and video decoder 300 may derive two initial motion vectors MV0 and MV1 using a signaled merge candidate index to select the merge candidate in a constructed merge list. When implementing bilateral matching, video encoder 200 and video decoder 300 search around the MV0 and MV1 and derive the final MV0' and MV1' based on a minimum bilateral matching cost.

Figure 5:
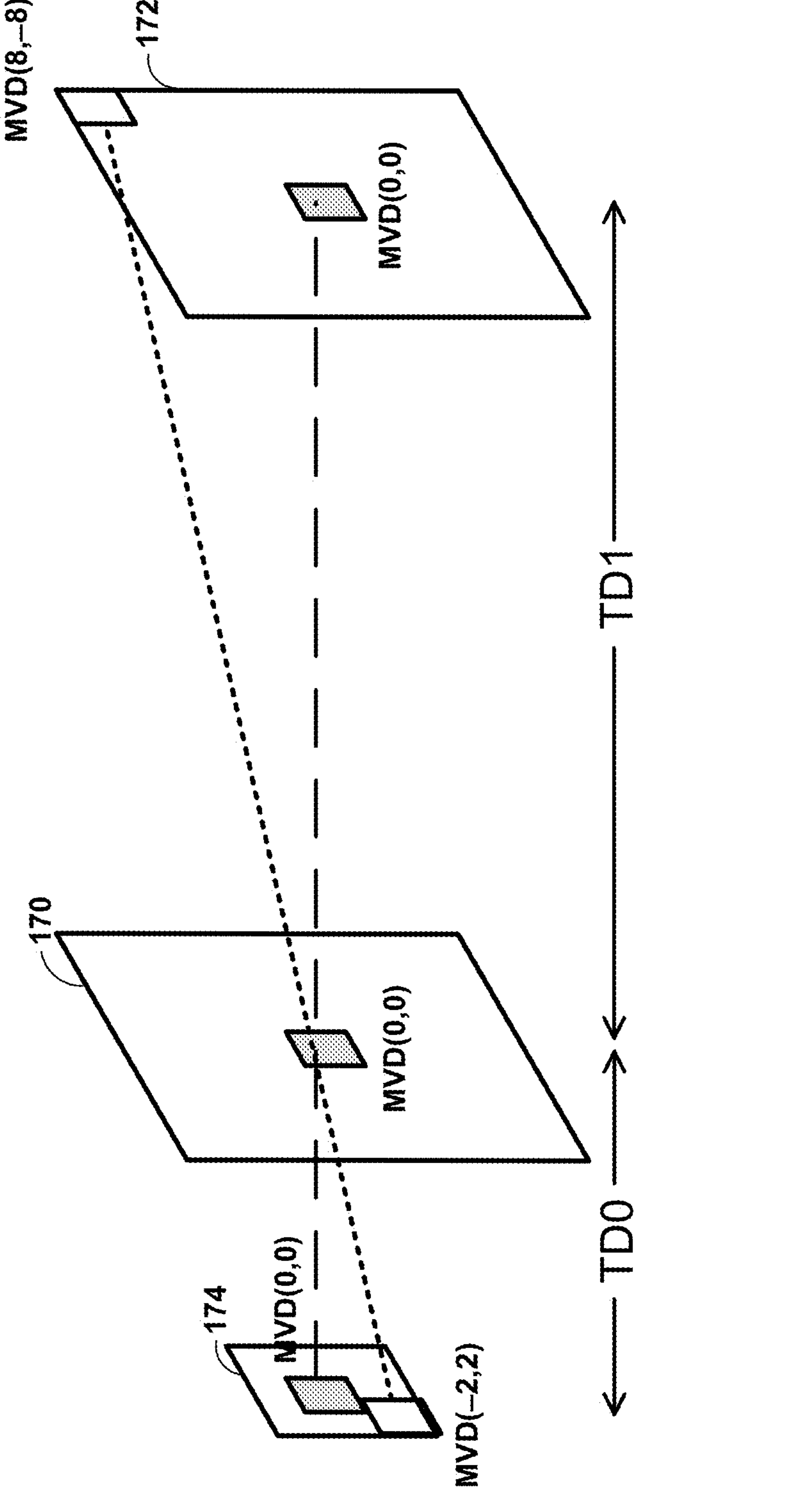
FIGS. 5 and 6 show examples of bi-lateral matching processes.

The motion vector difference MVD0 (denoted by MV0'−MV0) and MVD1 (denoted by MV1'−MV1) pointing to the two reference blocks may be proportional to the temporal distances (TD), e.g., TD0 and TD1, between the current picture and the two reference pictures. FIG. 5 shows an example of MVD0 and MVD1 where the distance (TD1) between current picture 170 and reference picture 172 is 4-times the distance (TD0) between current picture 170 and reference picture 174. FIG. 5 shows an example of MVD0 and MVD1 being proportional based on the temporal distances.

Figure 6:
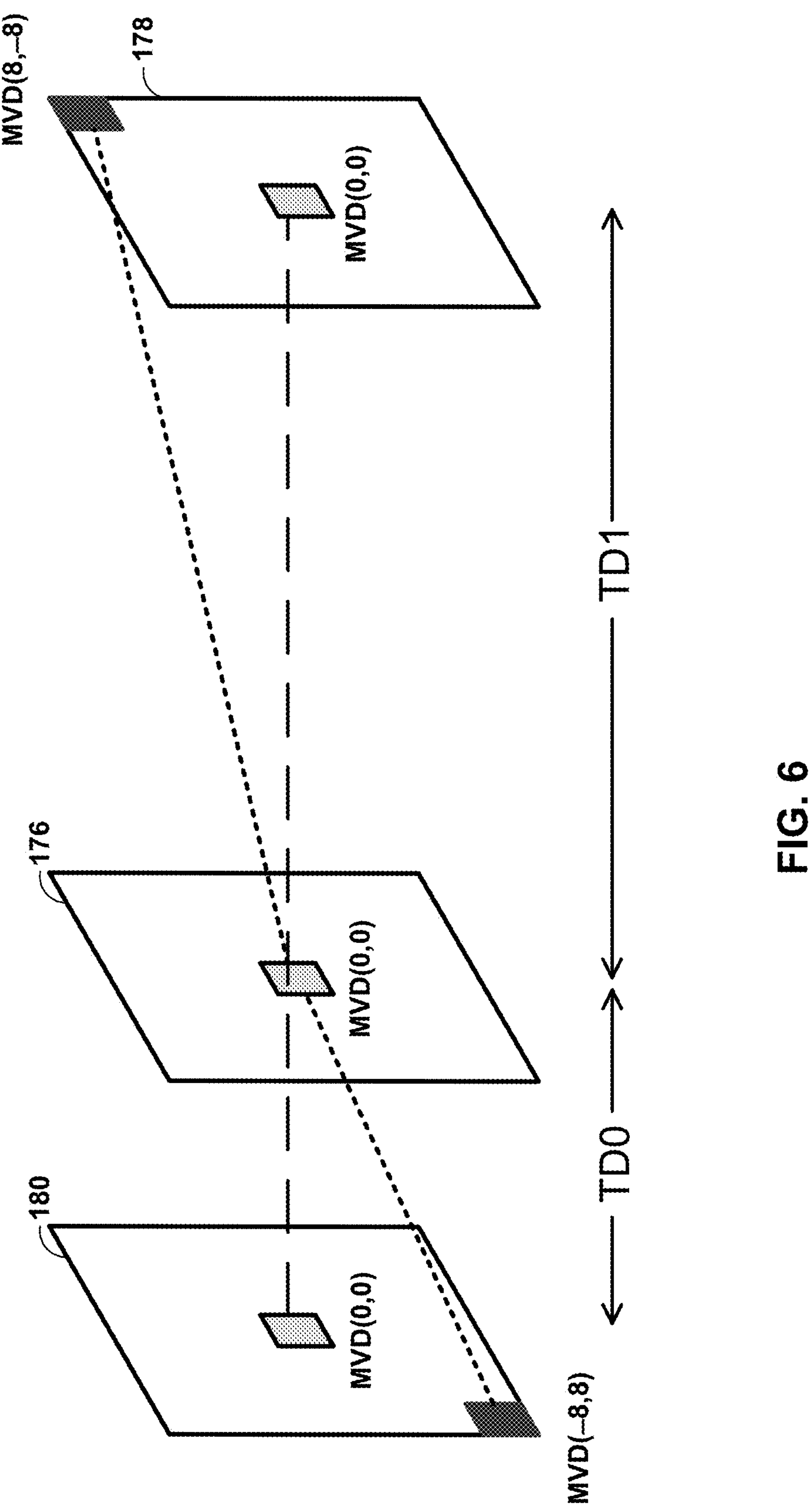

However, there is an optional design where MVD0 and MVD1 are mirrored regardless of the temporal distances TD0 and TD1. FIG. 6 shows an example of MVD0 and MVD1 being mirrored regardless of the temporal distance (TD1) between current picture 176 and reference picture 178 and the temporal distance (TD0) between current picture 176 and reference picture 180. FIG. 6 shows an example of mirrored MVD0 and MVD1, where TD1 is 4-times of TD0.

Figure 7:
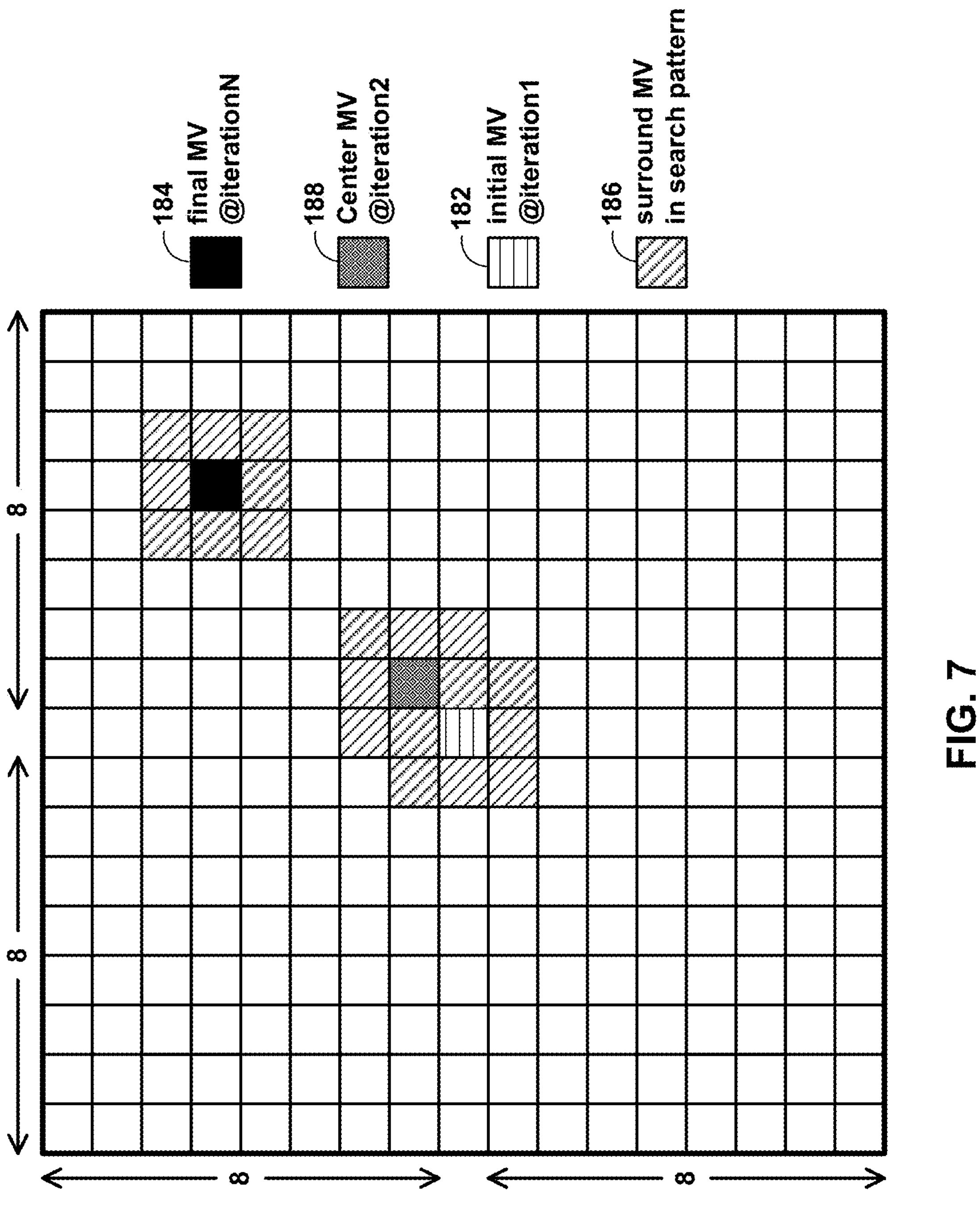
FIG. 7 shows an example search pattern for bilateral matching.

FIG. 7 shows an example of 3×3 square search patterns in the search range [−8, 8] for implementing bilateral matching. When implementing bilateral matching, video encoder 200 and video decoder 300 may be configured to perform a local search around the initial MV0 and MV1 to derive the final MV0' and MV1'. In the example of FIG. 7, the initial MV points to sample 182, and the final MV points to sample 184. The local search applies a 3×3 square search pattern to loop through the search range [−8, 8]. Samples 186 represent examples of samples in the search range around samples 182, 184, and sample 188. Sample 188 represents an example of a sample corresponding to a MV determined during an intermediate iteration of the search process. In each search iteration, the bilateral matching cost of the eight surrounding MVs in the search pattern are calculated and compared to the bilateral matching cost of center MV. The MV which has minimum bilateral matching cost becomes the new center MV in the next search iteration. The local search is terminated when the current center MV has a minimum cost within the 3×3 square search pattern or the local search reaches the pre-defined maximum search iteration.

Video encoder 200 and video decoder 300 may be configured to perform decoder-side motion vector refinement (DMVR). In VVC, DMVR may be applied to increase the accuracy of the MVs of the merge mode. In bi-prediction operation, a refined MV is searched around the initial MVs in the reference picture list L0 and reference picture list L1. The DMVR process calculates the distortion between the two candidate blocks in the reference picture list L0 and list L1.

Figure 8:
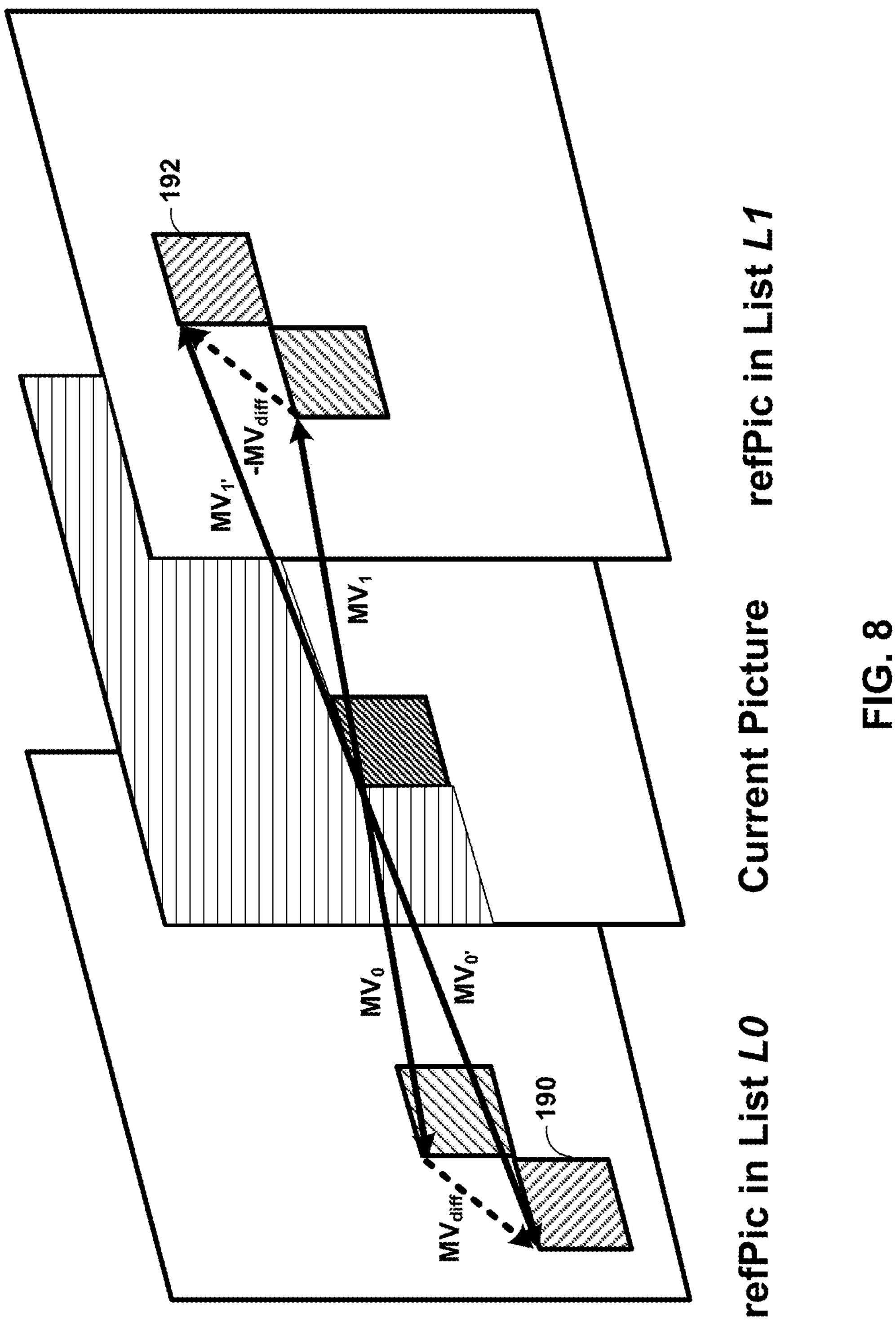
FIG. 8 shows an example of decoder-side motion vector refinement.

FIG. 8 shows an example of decoder-side motion vector refinement. As illustrated in FIG. 8, video encoder 200 and video decoder 300 may be configured to calculate the SAD between block 190 and block 192 based on each MV candidate around the initial MV. The MV candidate with the lowest SAD becomes the refined MV and used to generate the bi-predicted signal.

The refined MV derived by the DMVR process is used to generate the inter prediction samples and also used in temporal motion vector prediction for future picture coding. While the original MV is used in deblocking processes and also used in spatial motion vector prediction for future CU coding. DMVR is a subblock-based merge mode with a pre-defined maximum processing unit of 16×16 luma samples. When the width and/or height of a CU are larger than 16 luma samples, the CU may be further split into subblocks with width and/or height equal to 16 luma samples.

Video encoder 200 and video decoder 300 may be configured to implement a searching scheme. In DVMR, the search points are surrounding the initial MV and the MV offset obey the MV difference mirroring rule. In other words, any points that are checked by DMVR, denoted by candidate MV pair (MV0, MV1) obey the following two equations:

$$MV0' = MV0 + \mathrm{MV\_offset}$$

$$MV1' = MV1 - \mathrm{MV\_offset}$$

Where MV_offset represents the refinement offset between the initial MV and the refined MV in one of the reference pictures. In DMVR, the refinement search range is two integer luma samples from the initial MV. The searching includes the integer sample offset search stage and fractional sample refinement stage.

Video encoder 200 and video decoder 300 may be configured to apply a 25-point full search for integer sample offset searching. The SAD of the initial MV pair is first calculated. If the SAD of the initial MV pair is smaller than a threshold, the integer sample offset search stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, it is proposed to favor the original MV during the DMVR process. The SAD between the reference blocks referred by the initial MV candidates is decreased by ¼ of the SAD value.

Following the integer sample search, video encoder 200 and video decoder 300 may be configured to perform fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form:

$$E(x, y) = A(x - x_{min})^2 + B(y - y_{min})^2 + C$$

where $(x_{min}, y_{min})$ corresponds to the fractional position with the least cost and C corresponds to the minimum cost value. By solving the above equations by using the cost value of the five search points, the $(x_{min}, y_{min})$ is computed as follows:

$$x_{min} = (E(-1, 0) - E(1, 0))/(2(E(-1, 0) + E(1, 0) - 2E(0, 0)))$$

$$y_{min} = (E(0, -1) - E(0, 1))/(2((E(0, -1) + E(0, 1) - 2E(0, 0)))$$

The value of $x_{min}$ and $y_{min}$ are automatically constrained to be between −8 and 8 since all cost values are positive and the smallest value is E(0,0). This corresponds to a half-pel offset with 1/16th-pel MV precision in VVC. The computed fractional $(x_{min}, y_{min})$ are added to the integer distance refinement MV to get the sub-pixel accurate refinement delta MV.

Video encoder 200 and video decoder 300 may be configured to perform bilinear-interpolation and sample padding. In VVC, the maximum resolution of the MVs is 1/16 luma samples. The samples at the fractional position are interpolated using a 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, may be padded from those available samples.

Video encoder 200 and video decoder 300 may be configured to implement one or more enabling conditions for DMVR. In one example, video encoder 200 and video decoder 300 may be configured to enable DMVR if the following conditions are all satisfied, e.g., present or true.

- CU level merge mode with bi-prediction MV
- One reference picture is in the past and another reference picture is in the future with respect to the current picture
- The distances (e.g., POC difference) from both reference pictures to the current picture are same
- CU has more than 64 luma samples
- Both CU height and CU width are larger than or equal to 8 luma samples
- BCW weight index indicates equal weight
- WP is not enabled for the current block Combined intra and inter prediction (CIIP) mode is not used for the current block.

Video encoder 200 and video decoder 300 may be configured to perform multi-pass decoder-side motion vector refinement as in ECM. In the first pass, video decoder 300 may apply bilateral matching (BM) to the coding block. In the second pass, video decoder 300 may apply BM to each 16×16 subblock within the coding block. In the third pass, video decoder 300 may refine the MV in each 8×8 subblock by applying bi-directional optical flow (BDOF). The refined MVs are stored for both spatial and temporal motion vector prediction.

For the first pass, video decoder 300 may perform block based bilateral matching MV refinement. In the first pass, a refined MV is derived by applying BM to a coding block. Similar to DMVR, in bi-prediction operation, a refined MV is searched around the two initial MVs (MV0 and MV1) in the reference picture lists L0 and L1. The refined MVs (MV0_pass1 and MV1_pass1) are derived around the initiate MVs based on the minimum bilateral matching cost between the two reference blocks in L0 and L1.

For BM, video decoder 300 performs a local search to derive integer sample precision intDeltaMV. The local search applies a 3×3 square search pattern to loop through the search range [−sHor, sHor] in horizontal direction and [−sVer, sVer] in vertical direction, wherein, the values of sHor and sVer are determined by the block dimension, and the maximum value of sHor and sVer is 8.

A bilateral matching cost may be calculated as follows: bilCost=mvDistanceCost+sadCost. When the block size cbW*cbH is greater than 64, MRSAD cost function is applied to remove the DC effect of distortion between reference blocks. When the bilCost at the center point of the 3×3 search pattern has the minimum cost, the intDeltaMV local search is terminated. Otherwise, the current minimum cost search point becomes the new center point of the 3×3 search pattern and continue to search for the minimum cost, until it reaches the end of the search range.

Video decoder 300 may apply the existing fractional sample refinement to derive the final deltaMV. The refined MVs after the first pass may then derived as follows:

$$MV0\_\text{pass1} = MV0 + deltaMV$$

$$MV1\_\text{pass1} = MV1 - deltaMV$$

For the second pass, video decoder 300 may perform subblock based bilateral matching MV refinement. In the second pass, a refined MV is derived by applying BM to a 16×16 grid subblock. For each subblock, a refined MV is searched around the two MVs (MV0_pass1 and MV1_pass1), obtained on the first pass, in the reference picture list L0 and L1. The refined MVs (MV0_pass2 (sbIdx2)) and MV1_pass2(sbIdx2)) are derived based on the minimum bilateral matching cost between the two reference subblocks in L0 and L1.

For each subblock, video decoder 300 implements BM by performing a full search to derive integer sample precision intDeltaMV. The full search has a search range [−sHor, sHor] in horizontal direction and [−sVer, sVer] in vertical direction, wherein, the values of sHor and sVer are determined by the block dimension, and the maximum value of sHor and sVer is 8.

Figure 9:
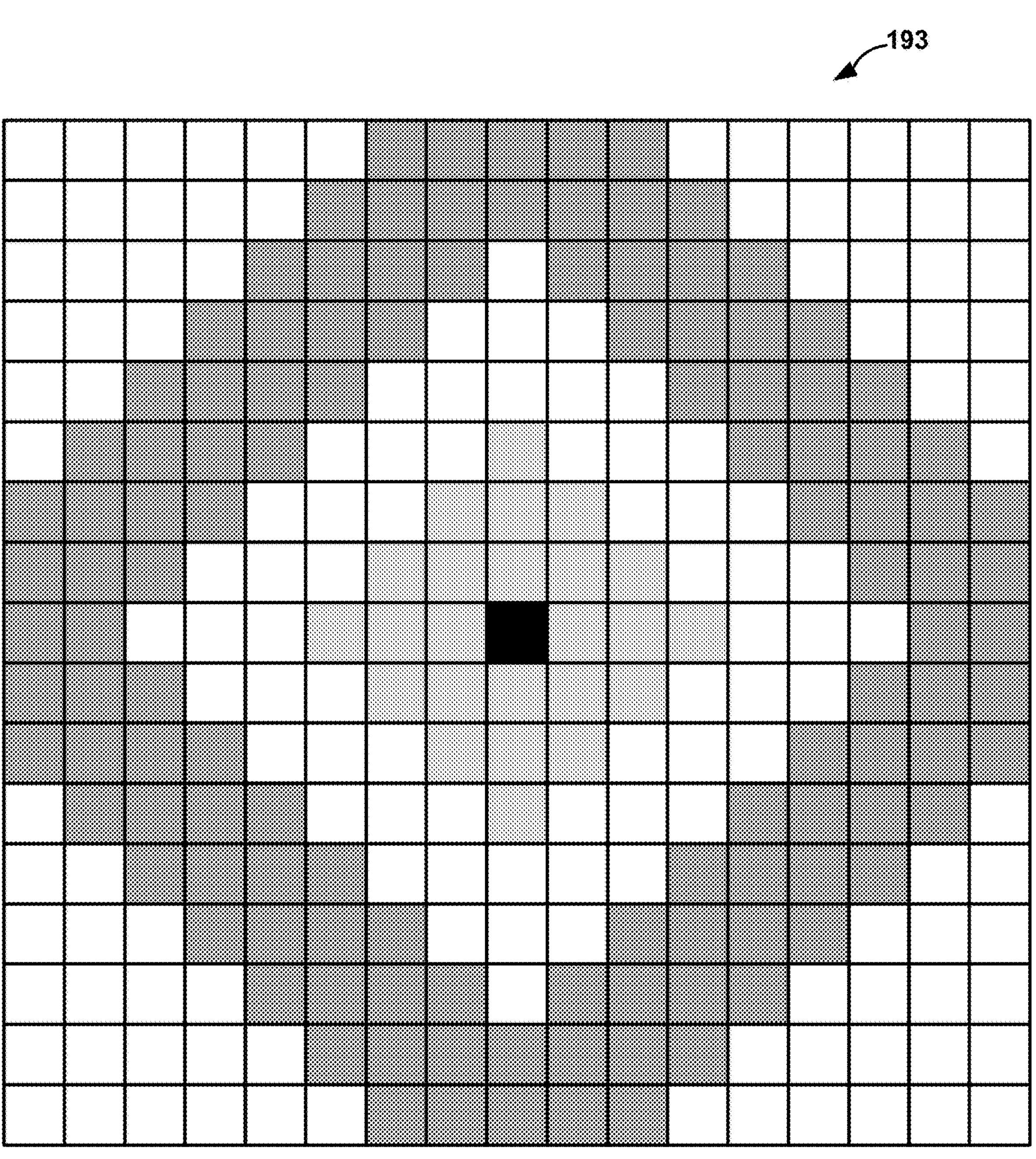
FIG. 9 shows an example of diamond-shaped search areas, which may be used for subblock-based bilateral matching motion vector refinement.

The bilateral matching cost is calculated by applying a cost factor to the sum of absolute transformed differences (SATD) cost between two reference subblocks as follows: bilCost=satdCost*costFactor. FIG. 9 illustrates an example diamond search region 193 for multi-pass decoder side motion refinement. The search area (2*sHor+1)*(2*sVer+1) is divided into 5 diamond shaped search regions, as shown in FIG. 9. Each search region is assigned a costFactor, which is determined by the distance (intDeltaMV) between each search point and the starting MV. Each diamond region is processed in the order starting from the center of the search area. In each region, the search points are processed in the raster scan order starting from the top left going to the bottom right corner of the region. When the minimum bilCost within the current search region is less than a threshold equal to sbW*sbH, the int-pel full search is terminated. Otherwise, the int-pel full search continues to the next search region until all search points are examined.

Video decoder 300 may apply the existing VVC DMVR fractional sample refinement to derive the final deltaMV (sbIdx2). The refined MVs at second pass is then derived as follows:

$$\text{MV0\_pass2}(sbIdx2) = MV0\_\text{pass1} + deltaMV(sbIdx2)$$

$$\text{MV1\_pass2}(sbIdx2) = MV1\_\text{pass1} + deltaMV(sbIdx2)$$

For the third pass, video decoder 300 performs subblock based BDOF MV refinement. In the third pass, a refined MV is derived by applying BDOF to an 8×8 grid subblock. For each 8×8 subblock, BDOF refinement is applied to derive scaled Vx and Vy without clipping starting from the refined MV of the parent subblock of the second pass. The derived bioMv(Vx, Vy) is rounded to 1/16 sample precision and clipped between −32 and 32.

Video decoder 300 may derive the refined MVs (MV0_pass3(sbIdx3) and MV1_pass3(sbIdx3)) at the third pass as follows:

$$\bullet\ \text{MV0\_pass3}(sbIdx3) = \text{MV0\_pass2}(sbIdx2) + bioMv$$

$$\bullet\ \text{MV1\_pass3}(sbIdx3) = \text{MV0\_pass2}(sbIdx2) - bioMv.$$

Video encoder 200 and video decoder 300 may be configured to implement bi-directional optical flow (BDOF). Bi-directional optical flow (BDOF) is used to refine the bi-prediction signal of luma samples in a CU at the 4×4 sub-block level. As its name indicates, the BDOF mode is based on the optical flow concept, which assumes that the motion of an object is smooth. For each 4×4 sub-block, a motion refinement ($v_x$, $v_y$) is calculated by minimizing the difference between the L0 and L1 prediction samples. The motion refinement is then used to adjust the bi-predicted sample values in the 4×4 sub-block. The following steps are applied in the BDOF process.

First, video encoder 200 and video decoder 300 computes the horizontal and vertical gradients, $$\frac{\partial I^{(k)}}{\partial x}(i, j) \text{ and } \frac{\partial I^{(k)}}{\partial y}(i, j),$$

k=0,1, of the two prediction signals by directly calculating the difference between two neighboring samples, i.e., $$\frac{\partial I^{(k)}}{\partial x}(i,j) = \left(I^{(k)}(i+1,j) >> \text{shift1}\right) - \left(I^{(k)}(i-1,j) >> \text{shift1}\right) \quad (1\text{-}6\text{-}1)$$

$$\frac{\partial I^{(k)}}{\partial y}(i,j) = \left(I^{(k)}(i,j+1) >> \text{shift1}\right) - \left(I^{(k)}(i,j-1) >> \text{shift1}\right)$$

where $I^{(k)}(i, j)$ are the sample value at coordinate (i, j) of the prediction signal in list k, k=0,1, and shift1 is calculated based on the luma bit depth, bitDepth, as shift1 is set to be equal to 6.

Then, video encoder 200 and video decoder 300 may calculate the auto- and cross-correlation of the gradients, $S_1$, $S_2$, $S_3$, $S_5$ and $S_6$, as follows:

$$S_1 = \sum_{(i,j)\in\Omega} |\psi_x(i,j)|, \quad (1\text{-}6\text{-}2)$$

$$S_3 = \sum_{(i,j)\in\Omega} \theta(i,j)\cdot(-\text{sign}(\psi_x(i,j)))$$

$$S_2 = \sum_{(i,j)\in\Omega} \psi_x(i,j)\cdot\text{sign}(\psi_y(i,j)) \quad (1\text{-}6\text{-}3)$$

$$S_5 = \sum_{(i,j)\in\Omega} |\psi_y(i,j)| S_6 = \sum_{(i,j)\in\Omega} \theta(i,j)\cdot(-\text{sign}(\psi_y(i,j)))$$

where $$\psi_x(i,j) = \left(\frac{\partial I^{(1)}}{\partial x}(i,j) + \frac{\partial I^{(0)}}{\partial x}(i,j)\right) >> \text{shift3}$$

$$\psi_y(i,j) = \left(\frac{\partial I^{(1)}}{\partial y}(i,j) + \frac{\partial I^{(0)}}{\partial y}(i,j)\right) >> \text{shift3}$$

$$\theta(i,j) = \left(I^{(0)}(i,j) >> \text{shift2}\right) - \left(I^{(1)}(i,j) >> \text{shift2}\right)$$

where Ω is a 6×6 window around the 4×4 sub-block, the value of shift2 is set to be equal to 4, and the value of shift3 is set to be equal to 1.

Video encoder 200 and video decoder 300 may then derview the motion refinement ($v_x$, $v_y$) using the cross- and auto-correlation terms as follows:

$$v_x = S_1 > 0?\text{clip3}(-th'_{BIO}, th'_{BIO}, -((S_3 << 2) >> \lfloor\log_2 S_1\rfloor)) : 0 \quad (1\text{-}6\text{-}4)$$

$$v_y = S_5 > 0?\text{clip3}(-th'_{BIO}, th'_{BIO}, -(((S_6 << 2) - ((v_x \cdot S_2) >> 1)) >> \lfloor\log_2 S_5\rfloor)) : 0$$

Where, $th_{BIO}'=1<<4$. $\lfloor\bullet\rfloor$ is the floor function.

Based on the motion refinement and the gradients, video encoder 200 and video decoder 300 may calculate the following adjustment for each sample in the 4×4 sub-block:

$$b(x,y) = v_x\cdot\left(\frac{\partial I^{(1)}(x,y)}{\partial x} - \frac{\partial I^{(0)}(x,y)}{\partial x}\right) + v_y\cdot\left(\frac{\partial I^{(1)}(x,y)}{\partial y} - \frac{\partial I^{(0)}(x,y)}{\partial y}\right) \quad (1\text{-}6\text{-}5)$$

Finally, video encoder 200 and video decoder 300 calculate the BDOF samples of the CU by adjusting the bi-prediction samples as follows:

$$pred_{BDOF}(x,y) = \left(I^{(0)}(x,y) + I^{(1)}(x,y) + b(x,y) + o_{offset}\right) >> \text{shift5} \quad (1\text{-}6\text{-}6)$$

wherein, shift5 is set equal to Max(3, 15−BitDepth) and the variable $o_{offset}$ is set equal to (1<<(shift5−1)).

These values are selected such that the multipliers in the BDOF process do not exceed 15-bit, and the maximum bit-width of the intermediate parameters in the BDOF process is kept within 32-bit.

Figure 10:
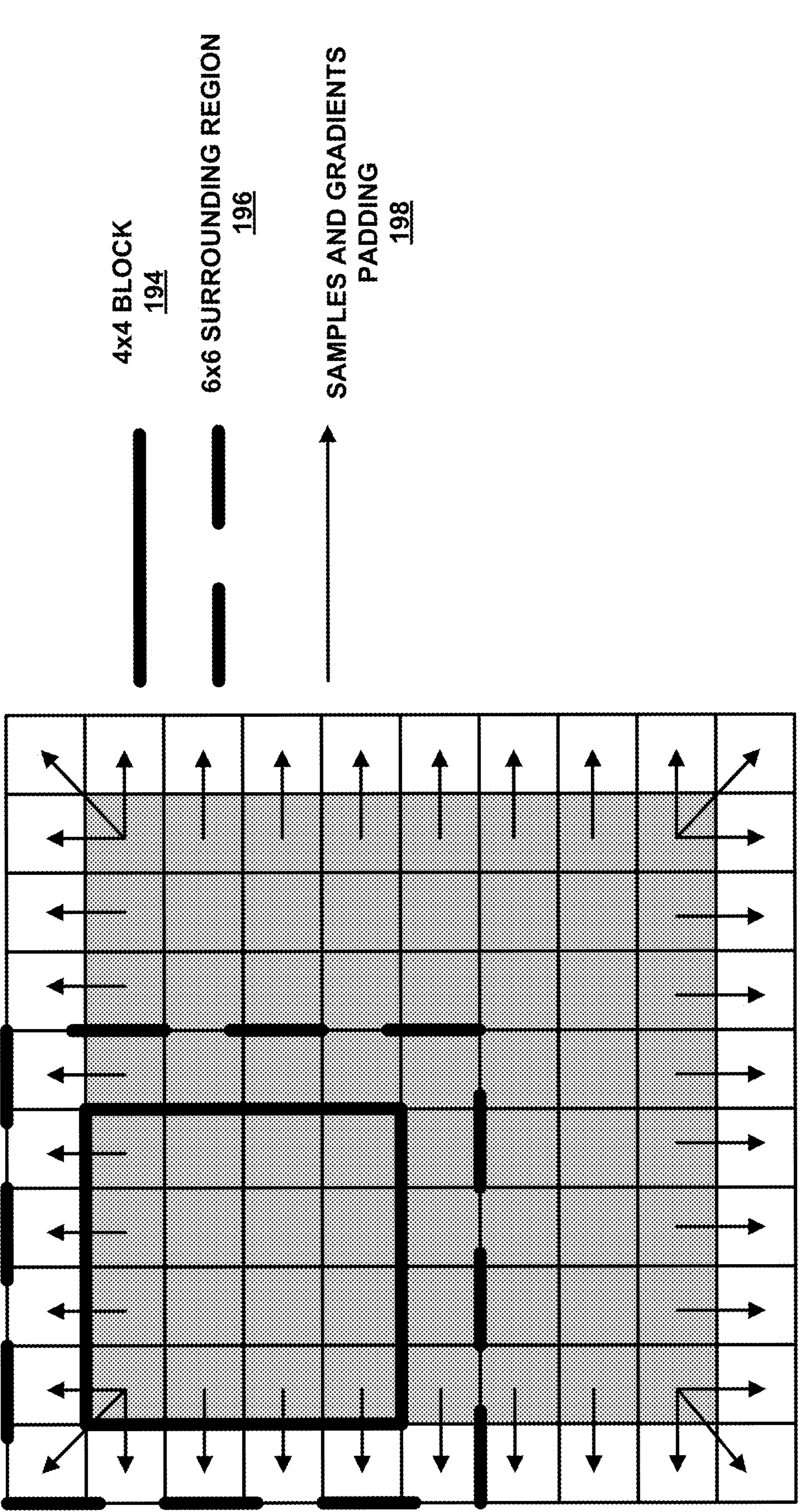
FIG. 10 shows an example of an extended coding unit (CU) region used in bi-direction optical flow (BDOF).

In order to derive the gradient values, some prediction samples $I^{(k)}(i, j)$ in list k (k=0,1) outside of the current CU boundaries need to be generated. As depicted in FIG. 10, the BDOF process uses one extended row and column around the CU's boundaries. In FIG. 10, the CU is shown as 4×4 block 194, and the one extended row and column is shown as 6×6 surrounding region 196. In order to control the computational complexity of generating the out-of-boundary prediction samples, prediction samples in the extended area (white positions) are generated by taking the reference samples at the nearby integer positions (using floor( ) operation on the coordinates) directly without interpolation, and the normal 8-tap motion compensation interpolation filter is used to generate prediction samples within the CU (gray positions). These extended sample values are used in gradient calculation only. For the remaining steps in the BDOF process, if any sample and gradient values outside of the CU boundaries are needed, then those values are padded (e.g., repeated) from nearest neighbors.

Video encoder 200 and video decoder 300 may use BDOF to refine the bi-prediction signal of a CU at the 4×4 subblock level. BDOF is applied to a CU if it satisfies all the following conditions:

- The CU is coded using "true" bi-prediction mode, i.e., one of the two reference pictures is prior to the current picture in display order and the other is after the current picture in display order
- The CU is not coded using affine mode or the ATMVP merge mode
- CU has more than 64 luma samples
- Both CU height and CU width are larger than or equal to 8 luma samples
- BCW weight index indicates equal weight
- WP is not enabled for the current CU
- CIIP mode is not used for the current CU Video encoder 200 and video decoder 300 may be configured to perform BDOF using multi-interation MV refinement. In JVET-AE0065, a process for "Iterative BDOF pass in multi-pass DMVR" was proposed and included in ECM. The process proposes to extend the multi-pass DMVR by adding 4-th BDOF MV refinement pass. The maximum subblock size of the 3-rd BDOF MV refinement pass is always 8×8, and maximum subblock size of the 4-th BDOF MV refinement pass is adaptively set to 4×4 when the coding block size is smaller than 1024 and 8×8 otherwise. When the subblock in the 3-rd BDOF MV refinement pass derives a delta motion with Vx is equal to 0 and Vy is equal to 0, the 4-th BDOF MV refinement pass is skipped.

Video encoder 200 and video decoder 300 may be configured to implement an affine motion model. An affine motion model can be described as follows:

$$\begin{cases} v_x = ax + by + e \\ v_y = cx + dy + f^a \end{cases}$$

wherein ($v_x$, $v_y$) is the motion vector at the coordinate (x, y), and a, b, c, d, e, and f are the six affine parameters. This affine motion model is referred to as 6-parameters affine motion model. In a typical video coder, a picture is partitioned into blocks for block-based coding. The affine motion model for a block can also be described by the 3 motion vectors (MVs) $\vec{v}_0=(v_{0x}, v_{0y})$, $\vec{v}_1=(v_{1x}, v_{1y})$, and $\vec{v}_2=(v_{2x}, v_{2y})$ at 3 different locations that are not in the same line. The 3 locations are usually referred to as control-points, the 3 motion vectors are referred to as control-point motion vectors (CPMVs). In the case when the 3 control-points are at the 3 corners of the block, the affine motion can be described as follows:

$$\begin{cases} v_x = \frac{(v_{1x}-v_{0x})}{blkW}x + \frac{(v_{2x}-v_{0x})}{blkH}y + v_{0x} \\ v_y = \frac{(v_{1y}-v_{0y})}{blkW}x + \frac{(v_{2y}-v_{0y})}{blkH}y + v_{0y} \end{cases}$$

wherein blkW and blkH are the width and height of the block.

In affine mode, video encoder 200 and video decoder 300 may derive different motion vectors for each pixel in the block according to the associate affine motion model. Therefore, motion compensation can be performed in pixel-by-pixel. However, to reduce the complexity, subblock based motion compensation is usually adopted, wherein the block is partitioned into multiple subblocks (that have smaller block size) and each subblock is associate with one motion vector for block-based motion compensation. The motion vector for each subblock is derived using the representative coordinate of the subblock. Typically, the center position is used. In one example, the block is partitioned into non-overlapping subblocks. The block width is blkW, block height is blkH, the subblock width is sbW and subblock height is sbH, then there's blkH/sbH rows of subblocks and blkW/sbW subblocks in each row. For a six-parameter affine motion model, the motion vector for the subblock (referred to as subblock MV) at $i_{th}$ row (0<=i<blkW/sbW) and $j_{th}$ (0<=j<blkH/sbH) column is derived as follows:

$$\begin{cases} v_x = \frac{(v_{1x}-v_{0x})}{blkW}\left(j*sbW + \frac{sbW}{2}\right) + \frac{(v_{2x}-v_{0x})}{blkH}\left(i*sbH + \frac{sbH}{2}\right) + v_{0x} \\ v_y = \frac{(v_{1y}-v_{0y})}{blkW}\left(j*sbW + \frac{sbW}{2}\right) + \frac{(v_{2y}-v_{0y})}{blkH}\left(i*sbH + \frac{sbH}{2}\right) + v_{0y} \end{cases}$$

The subblock MVs are rounded to the predefined precision and stored in the motion buffer for motion compensation and motion vector prediction.

A simplified 4-parameters affine model (for zoom and rotational motion) is described as follows:

$$\begin{cases} v_x = ax - by + e \\ v_y = bx + ay + f \end{cases}$$

Similarly, the 4-parameters affine model for a block can be described by 2 CPMVs $\vec{v}_0=(v_{0x}, v_{0y})$ and $\vec{v}_1=(v_{1x}, v_{1y})$ at the 2 corners (typically top-left and top-right) of the block. The motion field is then described as follows:

$$\begin{cases} v_x = \frac{(v_{1x}-v_{0x})}{blkW}x - \frac{(v_{1y}-v_{0y})}{blkW}y + v_{0x} \\ v_y = \frac{(v_{1y}-v_{0y})}{blkW}x + \frac{(v_{1x}-v_{0x})}{blkW}y + v_{0y} \end{cases}$$

The subblock MV at $i_{th}$ row and $j_{th}$ column is derived as follows:

$$\begin{cases} v_x = \frac{(v_{1x}-v_{0x})}{blkW}\left(j*sbW + \frac{sbW}{2}\right) - \frac{(v_{1y}-v_{0y})}{blkW}\left(i*sbH + \frac{sbH}{2}\right) + v_{0x} \\ v_y = \frac{(v_{1y}-v_{0y})}{blkW}\left(j*sbW + \frac{sbW}{2}\right) + \frac{(v_{1x}-v_{0x})}{blkW}\left(i*sbH + \frac{sbH}{2}\right) + v_{0y} \end{cases}$$

Video encoder 200 and video decoder 300 may be configured to perform prediction refinement for affine mode. After the sub-block based affine motion compensation is performed, the prediction signal can be refined by adding an offset derived based on the pixel-wise motion and the gradient of the prediction signal. The offset at location (m, n) can be calculated as follows:

$$\Delta I(m, n) = g_x(m, n) * \Delta v_x(m, n) + g_y(m, n) * \Delta v_y(m, n)$$

wherein $g_x$((m, n) is the horizontal gradient and $g_y$(m, n) is the vertical gradient of the prediction signal, respectively. $\Delta v_x$(m, n) and $\Delta v_y$(m, n) are the differences in x and y components between the motion vector calculated at location pixel location (m, n) and the subblock MV. Let the coordinate of the top-left sample of the subblock be (0,0), the center of the subblock is $$\left(\frac{sbW}{2}, \frac{sbH}{2}\right).$$

Given the affine motion parameters a, b, c, and d, $\Delta v_x$(m, n) and $\Delta v_y$(m, n) can be derived as follows:

$$\Delta v_x(m, n) = a*\left(m - \frac{sbW}{2}\right) + b*\left(n - \frac{sbH}{2}\right)$$
$$\Delta v_y(m, n) = c*\left(m - \frac{sbW}{2}\right) + d*\left(n - \frac{sbH}{2}\right)$$

In the control-points based affine motion model, the affine motion parameters a, b, c, and d are calculated from the CPMVs as follows:

$$a = \frac{(v_{1x}-v_{0x})}{blkW}$$
$$b = \frac{(v_{2x}-v_{0x})}{blkH}$$
$$c = \frac{(v_{1y}-v_{0y})}{blkW}$$
$$d = \frac{(v_{2y}-v_{0y})}{blkH}$$

Figure 11:
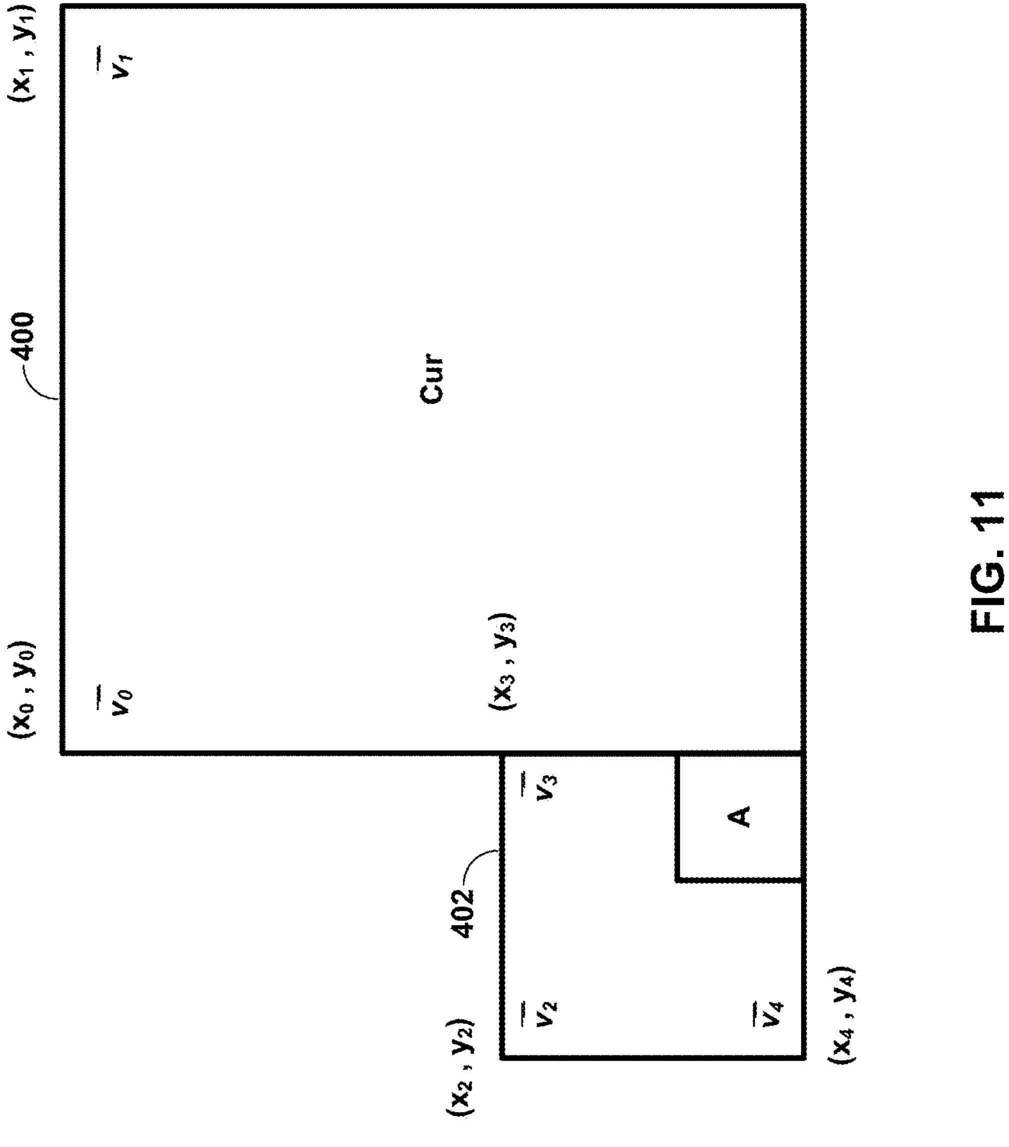
FIG. 11 shows an example of control point motion vector inheritance.

Video encoder 200 and video decoder 300 may be configured to implement an affine merge mode. In affine merge mode of VVC, the CPMVs of the current CU is generated based on the motion information of the spatial neighboring CUs. There can be up to five candidates and an index is signaled to indicate the one to be used for the current CU. The following three types of candidate are used to form the affine merge candidate list:

Inherited affine merge candidates that extrapolated from the CPMVs of the neighbor CUs Constructed affine merge candidates that are derived using the translational MVs of the neighbor CUs Zero MVs In VVC, when a neighboring affine CU is identified, video encoder 200 and/or video decoder 300 may use the CPMVs of the neighboring affine CU to derive the inherited affine merge candidate in the affine merge list of the current CU. As shown in FIG. 11, if the neighbor left bottom block A of current (cur) CU 400 is coded in affine mode, the motion vectors $v_2$, $v_3$ and $v_4$ of the top left corner, above right corner and left bottom corner of CU 402 which contains the block A are obtained. When block A is coded with a 4-parameter affine model, video encoder 200 and/or video decoder 300 calculate the two CPMVs of current CU 400 according to motion vectors $v_2$, and $v_3$. In case that block A is coded with a 6-parameter affine model, video encoder 200 and/or video decoder 300 calculate the three CPMVs of current CU 400 according to $v_2$, $v_3$ and $V_4$.

A constructed affine candidate means the candidate is constructed by combining the neighbor translational motion information of each control point. The motion information for the control points is derived from the specified spatial neighbors (A0, A1, A2, B0, B1, B2, and B3) and temporal neighbor (T) of current block 410 shown in FIG. 12. $CPMV_k$ (k=1, 2, 3, 4) represents the k-th control point. For $CPMV_1$, video encoder 200 and/or video decoder 300 check the B2→B3→A2 blocks in that order and the motion vector of the first available block is used. For $CPMV_2$, video encoder 200 and/or video decoder 300 check the B1→B0 blocks in that order. For $CPMV_3$, video encoder 200 and/or video decoder 300 check the A1→A0 blocks in that order. A TMVP candidate may be used as $CPMV_4$ if available.

After motion vectors of four control points are obtained, video encoder 200 and/or video decoder 300 construct affine merge candidates based on that motion information.

The following combinations of CPMVs are used, in order, to construct an affine candidate:

$\{CPMV_1, CPMV_2, CPMV_3\}$, $\{CPMV_1, CPMV_2, CPMV_4\}$, $\{CPMV_1, CPMV_3, CPMV_4\}$, $\{CPMV_2, CPMV_3, CPMV_4\}$, $\{CPMV_1, CPMV_2\}$, $\{CPMV_1, CPMV_3\}$

The combination of three CPMVs constructs a 6-parameter affine merge candidate and the combination of two CPMVs constructs a 4-parameter affine merge candidate. To avoid a motion scaling process, if the reference indices of control points are different, video encoder 200 and/or video decoder 300 may discard the related combination of CPMVs.

After inherited affine merge candidates and constructed affine merge candidate are checked, if the list is still not full, video encoder 200 and/or video decoder 300 may insert zero motion vectors to the end of the list (e.g., until the list reaches a predetermined number of candidates).

Video encoder 200 and video decoder 300 may be configured to perform implement an affine AMVP mode. In VVC, an affine flag in at CU level is signaled in the bitstream to indicate whether affine AMVP mode is used and then another flag is signaled to indicate whether 4-parameter affine or 6-parameter affine. In affine AMVP mode, the motion vector difference (MVD) between the CPMVs of current CU and their predictors CPMVPs is signaled in the bitstream together with the index of predictors and the index of the selected reference picture for each of the applicable prediction direction. In case of 4-parameter affine, two MVDs are signaled per applicable prediction direction. In case of 6-parameter affine, three MVDs are signaled per applicable prediction direction. When coding the $2^{nd}$ and $3^{rd}$ (in case of 6-parameter affine) MVD is further predicted by the $1^{st}$ MVD. Therefore, the difference between $2^{nd}$ and $1^{st}$ MVD instead of the $2^{nd}$ MVD is signaled in the bitstream, and the difference between $3^{rd}$ and $1^{st}$ MVD instead of the $3^{rd}$ MVD is signaled in the bitstream for the 6-parameter affine. Note that inter prediction direction is signaled beforehand to indicate whether it's bi-prediction, uni-prediction from reference picture list 0 or uni-prediction from reference picture list 1.

In VVC, the affine AVMP candidate list size is generated by using the following four types of CPMVP candidate in order:

Inherited affine AMVP candidates that extrapolated from the CPMVs of the neighbor CUs Constructed affine AMVP candidates CPMVPs that are derived using the translational MVs of the neighbor CUs Translational MVs from neighboring CUs Zero MVs The checking order of inherited affine AMVP candidates is same to the checking order of inherited affine merge candidates. The only difference is that, for AVMP candidate, only the affine CU that has the same reference picture as in current block is considered. No pruning process is applied when inserting an inherited affine motion predictor into the candidate list.

Constructed AMVP candidate is derived from the specified spatial neighbors. The same checking order is used as done in affine merge candidate construction. In addition, reference picture index of the neighboring block is also checked. The first block in the checking order that is inter coded and has the same reference picture as in current CUs is used. There is only one when the current CU is coded with 4-parameter affine mode, and $mv_0$ and $mv_1$ are both available, they are added as one candidate in the affine AMVP list. When the current CU is coded with 6-parameter affine mode, and all three CPMVs are available, they are added as one candidate in the affine AMVP list. Otherwise, constructed AMVP candidate is set as unavailable.

If affine AMVP list candidates is still less than maximum number after valid inherited affine AMVP candidates and constructed AMVP candidate are inserted, $mv_0$, $mv_1$ and $mv_2$ may be added, in order, as the translational MVs to predict all control point MVs of the current CU, when available. Finally, zero MVs are used to fill the affine AMVP list if it is still not full.

Video encoder 200 and video decoder 300 may be configured to utilize linear regression based affine merge candidates. In ECM6.0, linear regression based affine merge candidate derivation process proposed in JVET-AA0107 was adopted. In the proposal, two types of linear regression based affine merge candidates are derived, the non-refined and refined candidates. For both types of candidates, the derivation process is the same with only different sub-block motion information are used as the input.

Figure 13:
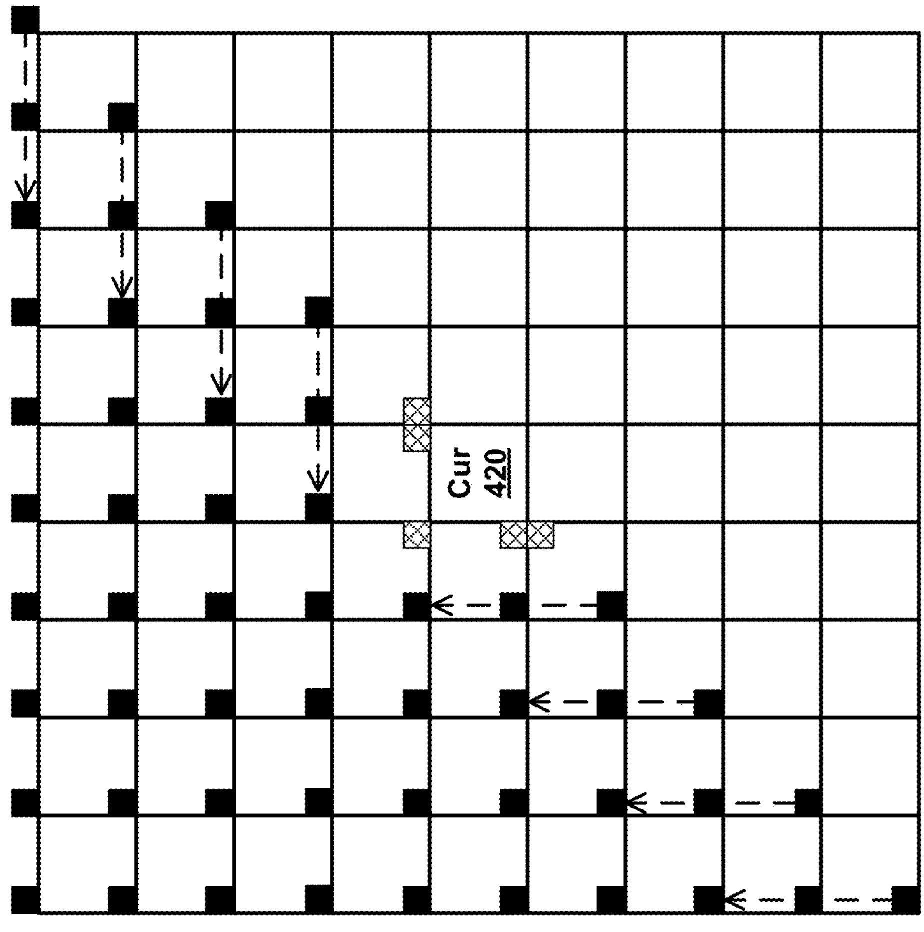
FIG. 13. example of searching for non-adjacent affine CU and use motion information to derive non-refined candidates.

FIG. 13 is a conceptual diagram illustrating example non-adjacent spatial neighboring blocks used to derive non-adjacent affine candidates. For the non-refined candidates, only the sub-block motion information from a non-adjacent affine CU is used as the input to the linear regression process. FIG. 3 shows an example of inputs to the linear regression process to derive the non-refined linear regression based affine merge candidates. As described above with respect to BDOF, certain scan patterns may be used in searching for non-adjacent affine CUs. Once a non-adjacent affine CU is identified, as in the example of FIG. 13, each of a sub-block's motion information including the sub-block's motion vectors denoted by $\{(mv_{x0}, mv_{y0}), (mv_{x1}, mv_{y1}), \ldots, (mv_{xN-1}, mv_{yN-1})\}$ and central coordinates denoted by $\{(x_0, y_0), (x_1, y_1), \ldots, (x_{N-1}, y_{N-1})\}$ are input to the linear regression process to derive non-refined affine merge candidates.

The scanning order may follow what is depicted in FIG. 13. For example, a non-adjacent affine CU may follow the scanning order of FIG. 13. The non-adjacent spatial neighbor blocks of current block 420 are checked based on their distances to current block 420, e.g., from near to far. At a specific distance, video encoder 200 or video decoder 300 may scan from right to left, horizontally, and bottom to top, vertically.

By using a scan patterns such as the one mentioned above or a different scan pattern, non-adjacent affine CU(s) may be identified, and their corresponding motion vector field(s) may potentially be used as the input to the linear regression process to derive an affine model of the current CU.

Figure 12:
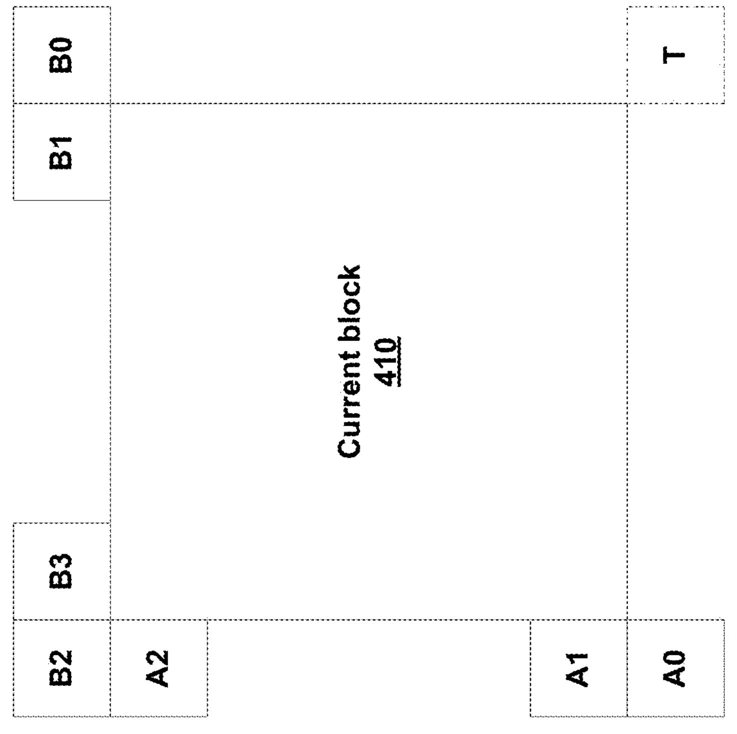
FIG. 12 shows locations of candidate positions for constructed affine merge mode.
Figure 14:
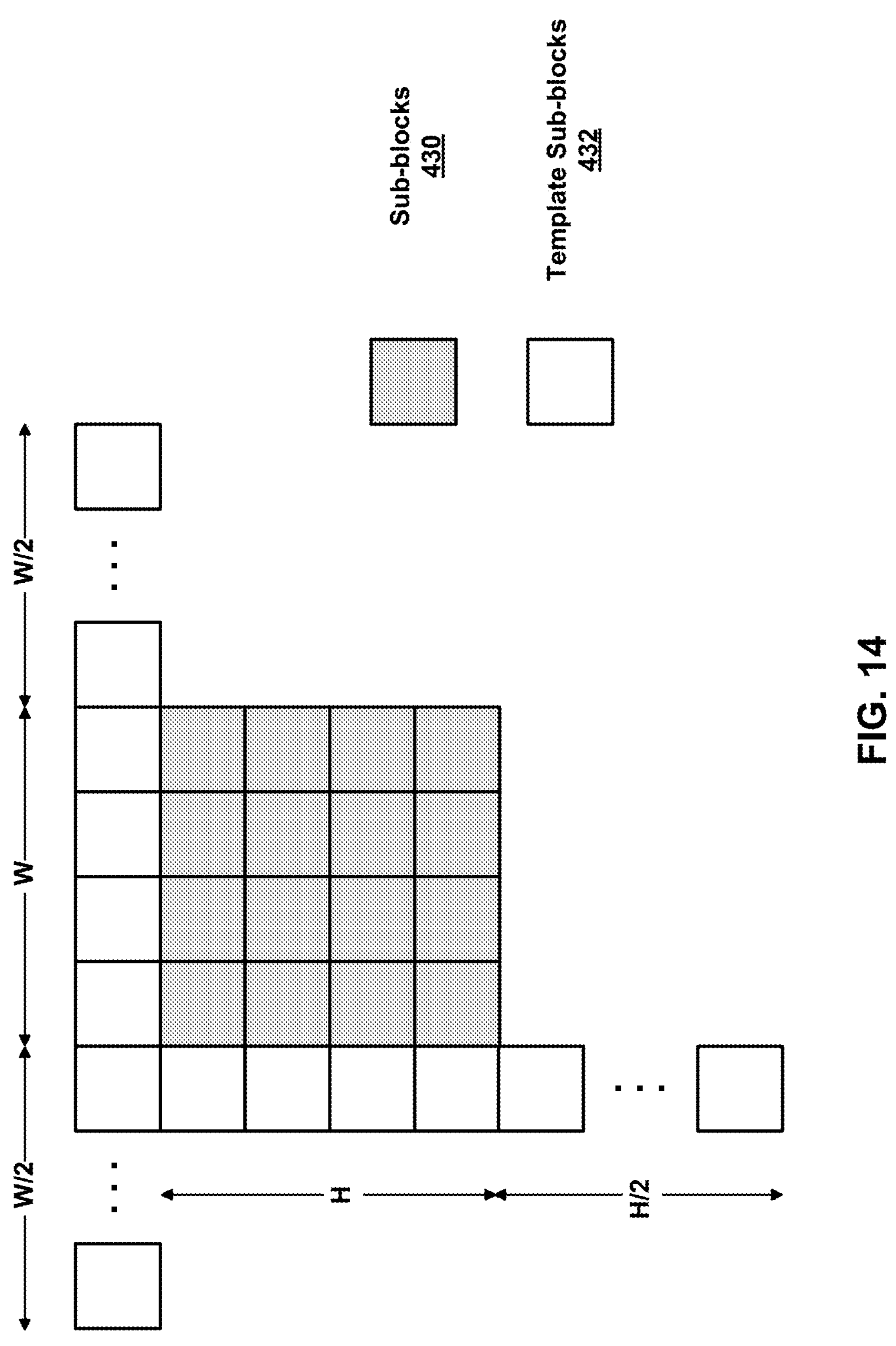
FIG. 14 shows an example of sub-block motion information used to derive refined candidates.

FIG. 14 shows an example of sub-block motion information used to derive refined candidates. For the refined candidates, in addition to the motion information from sub-blocks 430 in the non-adjacent affine CU (as shown in FIG. 12), motion information from the template sub-blocks 432 may additionally be included as input to the linear regression process.

The linear regression process for deriving both the non-refined as well as the refined candidates are the same which follows the mathematical derivation as explained in section 1.6. The only difference is which of the sub-blocks' information should be used as the input to the linear regression process.

Video encoder 200 and video decoder 300 may be configured to perform bilateral matching AMVP-merge mode as in ECM. The bi-directional predictor is composed of an AMVP predictor in one direction and a merge predictor in the other direction. The mode can be enabled to a coding block when the selected merge predictor and the AMVP predictor satisfy DMVR condition, where there is at least one reference picture from the past and one reference picture from the future relatively to the current picture and the distances from two reference pictures to the current picture are the same, the bilateral matching MV refinement is applied for the merge MV candidate and AMVP MVP as a starting point. Otherwise, if template matching functionality is enabled, template matching MV refinement is applied to the merge predictor or the AMVP predictor which has a higher template matching cost. The pipeline of AMVP-merge mode is illustrated in FIG. 15.

Figure 15:
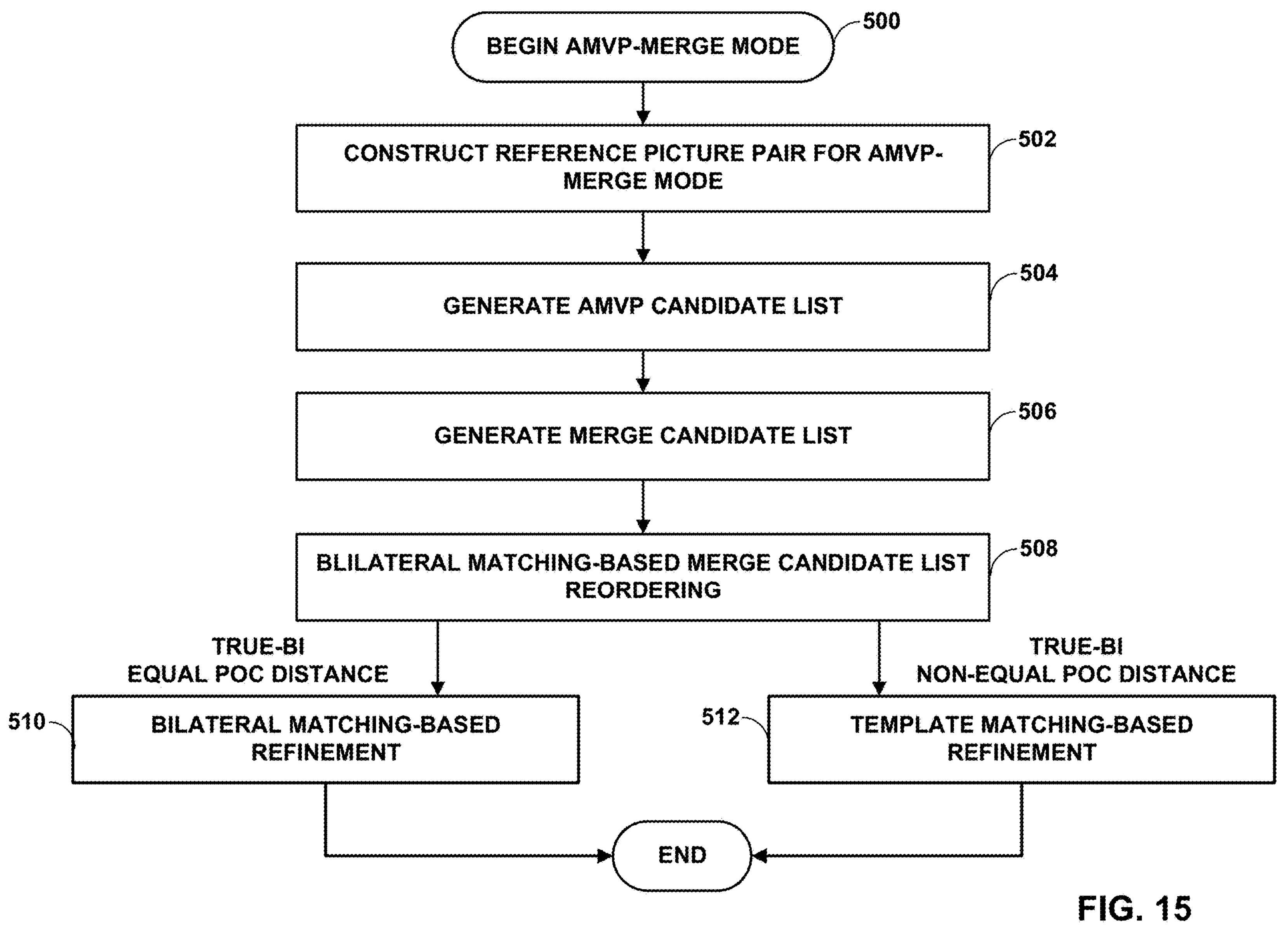
FIG. 15 is a flowchart illustrating an AMVP-Merge mode for a non-LDC picture.

In FIG. 15, the AMVP-merge mode process begins at 500. Then video encoder 200 and video decoder 300 may construct a reference picture pair for the AMVP-merge mode (502). Video encoder 200 and video decoder 300 may generate an AMVP candidate list (504) for one prediction direction, and may generate a merge candidate list (506) for the other prediction direction. In some examples, video encoder 200 and video decoder 300 may perform bilateral matching-based merge candidate list reordering (508) on the AMVP candidate list and/or the merge candidate list. Video encoder 200 and video decoder 300 may perform bilateral matching-based refinement (510) if the candidates have equal POC distance, and may perform template matching-based refinement if the candidates have unequal POC distance (512). The term "true-bi equal POC distance" refers to the situation where one reference picture has a POC that is less than the POC of the current picture, and the other reference picture has a POC that is greater than the POC of the current picture.

The AMVP part of the mode is signaled as a regular uni-directional AMVP, i.e., reference index and MVD are signaled, and it has a derived MVP index if template matching is used or MVP index is signaled when template matching is disabled.

For AMVP direction LX, X can be 0 or 1, the merge part in the other direction (1−LX) is implicitly derived by minimizing the bilateral matching cost between the AMVP predictor and a merge predictor, i.e., for a pair of the AMVP and a merge motion vectors. For every merge candidate in the merge candidate list which has that other direction (1−LX) motion vector, the bilateral matching cost is calculated using the merge candidate MV and the AMVP MV. The merge candidate with the smallest cost is selected. The bilateral matching refinement is applied to the coding block with the selected merge candidate MV and the AMVP MV as a starting point.

The third pass of multi pass DMVR which is 8×8 sub-PU BDOF refinement of the multi-pass DMVR is enabled to AMVP-merge mode coded block. The mode is indicated by a flag, if the mode is enabled AMVP direction LX is further indicated by a flag.

Existing techniques may exhibit several problems. In the current version of ECM, the bi-direction optical flow (BDOF) process is used to refine the motion vector at the 8×8 or 4×4 subblock level. The motion refinement $(v_x, v_y)$ is derived by minimizing the difference between the L0 and L1 prediction samples in an extended luma samples region. The motion refinement $(v_x, v_y)$ is then used to adjust each prediction sample of the 4×4 sub-block. The initial motion vector of each subblock can be a motion vector of the current block or a bilateral matching DMVR refined motion vector of at the 16×16 subblock level. The BDOF refined motion vector is stored and used for the future block motion vector prediction. The BDOF refined motion vector is used for deriving the bi-prediction signal of luma and chroma samples in the current block.

BDOF is also used to refine bi-prediction signal of luma samples in a coding block at the pixel level. The motion refinement $(v_x, v_y)$ is derived by minimizing the difference between the L0 and L1 prediction samples in an extended luma samples region. The motion refinement $(v_x, v_y)$ is then used to adjust each prediction sample of the current block.

When the current block is an affine block, the subblock motion vectors are derived from an affine model, the subblock motion vectors are used for deriving the bi-prediction signal of luma and chroma samples in the current block. However, the BDOF subblock motion vector refinement is not applied to an affine coded block or a TMVP coded block where the block or a sub-area of a block meets the BDOF conditions.

This disclosure describes processes to apply BDOF subblock motion vector (MV) refinement when the initial MV of the subblock is derived from an affine model, where the current block is an affine block and the subblock MVs are derived by applying the affine model at M×N subblock level, e.g., M=4 and N=4. A subset of the subblocks share same MVs may be refined by applying BDOF subblock MV refinement. This disclosure describes processes to apply BDOF subblock motion vector (MV) refinement when the initial MV of the subblock is derived from a temporal co-located block, where the current block has one or multiple subblocks. A subset of the subblocks share same MVs may be refined by applying BDOF subblock MV refinement.

The BDOF refined subblock MV may be stored for the future block motion prediction. The BDOF refine subblock MV may be used for deriving the current block bi-prediction signal of luma samples. The BDOF may also be used to refine the bi-prediction signal of luma samples for the current block.

In some examples, the BDOF refine subblock MV may be used for deriving the current block bi-prediction signal of luma samples.

In some examples, the BDOF may also be used to refine the bi-prediction signal of chroma samples for the current block.

In a first example, video encoder 200 and video decoder 300 may be configured to perform BDOF subblock refinement for an affine block. In this example, when a W×H coding block is determined to be an affine model coded block and the current block meets the conditions to apply bi-directional optical flow (BDOF), video encoder 200 and video decoder 300 may apply a BDOF process to refine the subblock motion vector (MV) of the coding block and to apply BDOF to refine the bi-prediction signal. The initial MV of each subblock is derived by applying affine model at M×N subblock level. One or several M×N subblocks which shares the same MV may be grouped to apply BDOF subblock refinement at P×Q subblock level. The BDOF refined MV may be stored for the future block motion prediction. The BDOF refined MV may be used for the current block bi-prediction signal derivation, as known as motion compensation.

The BDOF may also be used to refine the bi-prediction signal of luma samples. The BDOF may also be used to refine the bi-prediction signal of chroma samples.

An example BDOF process for affine blocks is as follows.

The current block is determined to be coded as an affine block. The current coding block has a dimension W×H. The current block is divided into K1 subblocks, denoted as AffineSubPu, where each AffineSubPu has a dimension M×N, e.g., M is equal to 4 and N is equal to 4.

Each subblock has a MV that is derived from the affine model and the position of the subblock.

The proposed BDOF process starts with an input block (name as S1), wherein, S1 has a dimension W_1×H_1, wherein, the dimension of S1 is equal or less than the dimension of the coding block and the dimension of S1 is equal or larger than the AffineSubPu dimension. E.g., M≤W_1≤W and N≤H_1≤H. The initial motion vector for S1, denote as MV_S1_L0 and MV_S1_L1 for MV in reference picture 0 and reference picture 1 respectively.

In some examples, when S1 has only one AffineSubPu, the MV of AffineSubPu is used as MV_S1_L0 and MV_S1_L1.

In some examples, when S1 has more than one AffineSubPu, each AffineSubPu has identical MV. The MV of AffineSubPu is used as MV_S1_L0 and MV_S1_L1.

In some examples, when S1 has more than one AffineSubPu, the largest MV difference between two AffineSubPu is less than a threshold. E.g., the sum of absolute differences between two MV in horizontal direction and vertical direction is less than a threshold. In one example, an average of MV of each AffineSubPu is used as MV_S1_L0 and MV_S1_L1. In another example, the MV of one AffineSubPu is used as MV_S1_L0 and MV_S1_L1, e.g., the AffineSubPu is at the top-left corner of the S1, e.g., the AffineSubPu is at the center of the S1.

The input block S1 is divided to K2 sub-blocks (name as S2), wherein, S2 has a dimension W_2×H_2, wherein, the dimension of S2 is equal or less than the dimension of S1. E.g., W_2≤W_1 and H_2<H_1.

In some examples, for each S2, determined by a condition, S2 is decided to whether apply BDOF or not. In some examples, the condition is to check whether the SAD between two prediction signals in reference picture 0 and reference picture 1 are less than a threshold or not. The subblock in this step defines a basic unit for decision of whether to apply BDOF to all the samples within the unit.

When decided to apply BDOF to a S2, the BDOF process is applied to derive a delta MV ($v_x$, $v_y$), denoted as bioMvS2, the MV for S2 is derived as MV_S2_L0=MV_S1_L0+bioMvS2, MV_S2_L1=MV_S1_L1−bioMvS2. The prediction signal of S2 is derived by motion compensation using the MV for S2.

A S2 is divided to K3 sub-blocks (name as S3), wherein, S3 has a dimension W_3×H_3, wherein, the dimension of S3 is equal or less than the dimension of S2. When per-pixel BDOF refinement is applied, W_3 is equal to H_3 is equal to 1. For each S3, the BDOF process is applied to derive a refined motion vector ($v'_x$, $v'_y$), and use the refined motion vector to derive an offset for each sample in S3. The prediction signal of S3 is derived by applying the offset to each sample of the predicted signal of S2, corresponding to the position of S3 in S2. In some examples, an offset is only applied to luma samples. In some examples, an offset is applied to each available color components.

Video encoder 200 and video decoder 300 may be configured to perform one iteration subblock MV refinement. In this examples the BDOF process is applied only one time to derive a delta MV ($v_x$, $v_y$) for S2. In some examples, S2 has a predetermined dimension 4×4, e.g., W_2 is equal to 4 and H_2 is equal to 4. In some examples, S2 has adaptive dimension with maximum dimension of 8×8 and minimum dimension of 4×4, the dimension is determined by checking input block dimension of S1. A subset of following condition may be used to determine the dimension of S2:

When W_1 is larger than 8 but not integer multiple of 8 or H_1 is larger than 8 but not multiple of 8, then S2 dimension is determined to be 4×4.

When W_1*H_1 is larger than a threshold, W_1 is larger than 8 and H_1 is larger than 8, then S2 dimension is determined to be 8×8.

When W_1*H_1 is larger than a threshold, W_1 is larger than 8 and integer multiple of 8, H_1 is equal to 4, then S2 dimension is determined to be 8×4.

When W_1*H_1 is larger than a threshold, H_1 is larger than 8 and integer multiple of 8, W_1 is equal to 4, then S2 dimension is determined to be 4×8.

When W_1*H_1 is smaller than a threshold, then S2 dimension is determined to be 4×4.

Video encoder 200 and video decoder 300 may be configured to perform multi-iterative subblock MV refinement. In this example, the BDOF process is applied multiple times.

Video encoder 200 and video decoder 300 may be configured to perform a multi-iteration BDOF process on same subblock dimension. In some examples, the subblock dimension of S2 is determined as in the examples described above with respect to one iteration subblock MV refinement. Each S2 may be refined by applying BDOF process multiple times to derive the final delta MV. For example, at the first time of applying BDOF process, the initial MV is MV_S1_L0 and MV_S1_L1, after BDOF process, it derives a bioMvS2_1. At the second time of applying BDOF process, the initial MV is (MV_S1_L0+bioMvS2_1) and (MV_S1_L1−bioMvS2_1), after BDOF process it derives a bioMvS2_2. At the K-th time of applying BDOF process, the initial MV is (MV_S1_L0+bioMvS2_(K−1)) and (MV_S1_L1−bioMvS2_(K−1)), after BDOF process it derives a bioMvS2_K. The final MV of a S2 is (MV_S1_L0+bioMvS2_1+bioMvS2_2+ . . . +bioMvS2_K) and (MV_S1_L1−bioMvS2_1−bioMvS2_2− . . . −bioMvS2_K).

Video encoder 200 and video decoder 300 may be configured to perform multi-iterative BDOF process on reduced subblock dimension. In some examples, given an affine coded block has a dimension W×H, the BDOF refinement start with a subblock dimension W_iter1×H_iter1 and the BDOF process repeated multiple iterations while the subblock dimension reduces after each precede iteration. The subblock at K-th iteration has a dimension W_iterK×H_iterK, Wherein, W_iterK≤W_iter(K−1) and H_iterK≤H_iter(K−1). Wherein, W_iter1≤W and H_iter1≤H. For example, when coding block is a 64×64 affine coded block, the subblock dimension at first iteration is 16×16, the subblock dimension at second iteration is 8×8, the subblock dimension at third iteration is 4×4.

Given an affine subblock MV is derived from the block affine model and the subblock position corresponding to the block top-left position, e.g., the center position of the subblock is used to derive the subblock MV, at K-th iteration of the BDOF process the initial MV of each subblock is derived as follows:

$$\text{Affine\_subblock\_}K\text{\_MV\_}L0+\text{bioMvIter}(K-1)+\text{bioMvIter}(K-2)+\ldots+\text{bioMvIter1}$$

$$\text{Affine\_subblock\_}K\text{\_MV\_}L1-\text{bioMvIter}(K-1)-\text{bioMvIter}(K-2)-\ldots-\text{bioMvIter1}$$

wherein, Affine_subblock_MV_L0 and Affine_subblock_MV_L1 are derived base on the subblock dimension and its position (e.g., center position) corresponding to the block and the block affine model.

Wherein, the bioMvIterK is the delta MV that is derived from the K-th iteration of the subblock that corresponds to the current subblock, in other words the current subblock is a subblock of the preceded iteration subblock.

Wherein, the first iteration of BDOF process use only the Affine_subblock_MV_L0 and Affine_subblock_MV_L1 as the initial MV.

The final MV after K iterations BDOF process is derived as follows:

$$\text{Affine\_subblock\_}K\text{\_MV\_}L0+\text{bioMvIter}K+\text{bioMvIter}(K-1)+\ldots+\text{bioMvIter1}$$

$$\text{Affine\_subblock\_}K\text{\_MV\_}L1-\text{bioMvIter}K-\text{bioMvIter}(K-1)-\ldots-\text{bioMvIter1}$$

For example, when coding block is a 64×64 affine coded block, the BDOF process is as follows:

At the first iteration, the subblock dimension is 16×16, there are 4 subblocks to be refined with BDOF, each of the four subblocks has an initial MV as follows:

- Subblock0: Affine_subblock0_1_MV_L0 and Affine_subblock0_1_MV_L1, after BDOF process it derives a delta MV bioMvIter1_subblock0
- Subblock1: Affine_subblock1_1_MV_L0 and Affine_subblock1_1_MV_L1, after BDOF process it derives a delta MV bioMvIter1_subblock1
- Subblock2: Affine_subblock2_1_MV_L0 and Affine_subblock2_1_MV_L1, after BDOF process it derives a delta MV bioMvIter1_subblock2
- Subblock3: Affine_subblock3_1_MV_L0 and Affine_subblock3_1_MV_L1, after BDOF process it derives a delta MV bioMvIter1_subblock3

At the second iteration, the subblock dimension is 8×8, the subblock0 from the first iteration is then divided to 4 subblocks, each of the four subblocks has an initial MV as follows:

- Subblock0: (Affine_subblock0_2_MV_L0+bioMvIter1_subblock0) and (Affine_subblock0_2_MV_L1−bioMvIter1_subblock0), after BDOF process it derives a delta MV bioMvIter2_subblock0
- Subblock1: (Affine_subblock1_2_MV_L0+bioMvIter1_subblock0) and (Affine_subblock1_2_MV_L1−bioMvIter1_subblock0), after BDOF process it derives a delta MV bioMvIter2_subblock1
- Subblock2: (Affine_subblock2_2_MV_L0+bioMvIter1_subblock0) and (Affine_subblock2_2_MV_L1−bioMvIter1_subblock0), after BDOF process it derives a delta MV bioMvIter2_subblock2
- Subblock3: (Affine_subblock3_2_MV_L0+bioMvIter1_subblock0) and (Affine_subblock3_2_MV_L1−bioMvIter1_subblock0), after BDOF process it derives a delta MV bioMvIter2_subblock3

At the third iteration, the subblock dimension is 4×4, the subblock0 from the second iteration is then divided to 4 subblocks, each of the four subblocks has an initial MV as follows:

- Subblock0: (Affine_subblock0_3_MV_L0+bioMvIter1_subblock0+bioMvIter2_subblock0) and (Affine_subblock0_3_MV_L1−bioMvIter1_subblock0−bioMvIter2_subblock0), after BDOF process it derives a delta MV bioMvIter3_subblock0
- Subblock1: (Affine_subblock1_3_MV_L0+bioMvIter1_subblock0+bioMvIter2_subblock0) and (Affine_subblock1_3_MV_L1−bioMvIter1_subblock0−bioMvIter2_subblock0), after BDOF process it derives a delta MV bioMvIter3_subblock0
- Subblock2: (Affine_subblock2_3_MV_L0+bioMvIter1_subblock0+bioMvIter2_subblock0) and (Affine_subblock2_3_MV_L1−bioMvIter1_subblock0−bioMvIter2_subblock0), after BDOF process it derives a delta MV bioMvIter3_subblock0
- Subblock3: (Affine_subblock3_3_MV_L0+bioMvIter1_subblock0+bioMvIter2_subblock0) and (Affine_subblock3_3_MV_L1−bioMvIter1_subblock0−bioMvIter2_subblock0), after BDOF process it derives a delta MV bioMvIter3_subblock0

The final MV of the top-left 4×4 subblock after three iterations BDOF refinement is then derived as follows:

- Affine subblock0_3_MV_L0+bioMvIter1_subblock0+bioMvIter2_subblock0+bioMvIter3_subblock0
- Affine_subblock0_3_MV_L1−bioMvIter1_subblock0−bioMvIter2_subblock0−bioMvIter3_subblock0

Video encoder 200 and video decoder 300 may be configured to perform refined MV storing and affine model storing. When the current block is an affine coded block, the MV information of each M×N subblock, e.g., M=N=4, may be stored and used for future blocks, e.g., future block MV prediction. The affine model of the current block is also stored and used for future blocks affine model prediction. Wherein, the affine model is the Control-Point Motion Vectors (CPMVs) for the current block.

In some examples, after BDOF refinement, the final MV with BDOF refinement of each subblock may be stored and used for future blocks, e.g., future block MV prediction. In some examples, the block affine model is stored unchanged and used for future blocks affine model prediction. In some examples, a block affine model is derived from the BDOF refined subblock MV. The derived affine model is stored and used for future blocks affine model prediction. In one example, the affine model is derived by using linear regression based affine model candidate derivation as described above with respect to linear regression based affine merge candidates.

Video encoder 200 and video decoder 300 may be configured to perform high level syntax control. The proposed process may be controlled by the same high-level syntax of BDOF. The proposed process may be controlled by a separate high-level syntax, affine_bdof_enabled_flag that is signaled at SPS, VPS, picture header, slice header, or CU level et al. The affine_bdof_enabled_flag may be conditionally signaled depending on the high-level syntax of BDOF. For example, if BDOF is disabled, the affine_bdof_enabled_flag is not signaled in the bitstream and is inferred to be 0 (indicating not enabled).

Video encoder 200 and video decoder 300 may be configured to implement enabling conditions. The techniques of this disclosure may be enabled when the current block is an affined coded block and meets all or a subset of the following conditions:

- The proposed process is enabled (indicated by a high level syntax)
- The block is a bi-prediction block.
- Both reference pictures have same resolution as the current picture.
- Both reference pictures are not long-term reference pictures.
- At least one predictor is on a reference picture that relative to the past of the current picture and at least one predictor is on a reference picture that relative to the future of the current picture.
- The two reference pictures have equal POC distance relative to the current picture.
- The weight of two predictor is equal, e.g., the parameter value of BCW is equal to BCW_DEFAULT
- The Local Illumines Compensation (LIC) is not applied to the current block.

The enabling conditions may also need to meet the one of the following condition checks:

- In some examples, when the current block is determined to apply subblock-based affine motion compensation, the proposed process is applied.
- In some examples, when Overlapped Block Motion Compensation (OBMC) is applied to the current block, the proposed process is applied.
- In some examples, when the current block is not determined to apply pixel-based affine motion compensation, the proposed process is applied.

The enabling conditions may also need to meet the one or several of the following condition checks:

- The block is an affine merge coded block.
- The block is an amvp-merge mode coded block.
- The block is a Bilateral Matching affine merge code block.
- The block is not coded with MVD.

In some examples, video encoder 200 and video decoder 300 may be configured to perform BDOF subblock refinement for temporal motion vector prediction (TMVP) block. In this example, when the current block is a TMVP coded block, the aforementioned BDOF subblock refinement is applied to current block or a sub-area. In this case, the initial MV of BDOF process is the MV of the co-location block in a temporal picture.

In some examples, the sub-area contains the blocks meets the enabling conditions described above. In some examples, if a block does not meet the enabling conditions described above, it is replaced by the MV of spatial block, other temporal block or a default block.

In some examples, after BDOF refinement, the final MV with BDOF refinement may be stored and used for future blocks, e.g., future block MV prediction.

In some examples, video encoder 200 and video decoder 300 may be configured to perform a BDOF process simplification regarding extended area motion compensation. In this example, processes to reduce the complexity of BDOF process are implemented. The techniques may be applied to the proposed techniques in this disclosure and may also be applied to the existing BDOF process in the current ECM.

In current ECM, a subblock BDOF process requires to do MC on an extended luma block to derive gradient information. The extended luma block is a block that has 3 lines/3 columns surrounding the subblock on each side. When the subblock size is 4×4, the extended luma block has a dimension of 10×10, which requires a MC of 10×10 luma area. When the design of minimum area of MC is 4×4, the extended luma block requires a MC of 12×12 luma area.

To reduce the computational complexity of MC with the consideration of design of minimum 4×4 MC area, video encoder 200 and video decoder 300 may derive partially of the extended luma block by pixel padding. The padded pixel can be derived from the closest pixel which is derived by MC.

Given a subW×subH subblock, the extended luma block has a dimension of (subW+6)×(subH+6). Wherein, subW is integer multiple of 4 and subH is integer multiple of 4.

In some examples, the MC area of the subblock is subW×subH and the surrounding area of 3 lines/3 columns on each side are derived by pixel padding.

In some examples, the MC area of the subblock is (subW+4)×(subH+4) and the surrounding area of 1 line/1 column on each side are derived by pixel padding.

In some examples, when the subblock size subW*subH is less than a threshold, the pixel padding process is applied.

In some examples, when the multi-iterative BDOF process is applied to a coding block, pixel padding is applied to one or several iterations.

In the current version of ECM, BDOF MV refinement may be applied to coding blocks in two iterations. As described above, the 3rd pass may have a maximum subblock size of 8×8 and the 4th pass may have an adaptive subblock size of 4×4 or 8×8. However, when a coding block has a block size of 4×4, the same block may be refined by BDOF two times. The complexity may not be comparable to the coding benefit. A similar issue may happen when the coding block has a size of 4×N or N×4.

BDOF MV refinement may also be applied to an affine coded block, after 2-D grouping of identical motion of 4×4 subblocks, the MV of the grouped affineSubblock may be refined by applying BDOF. In the proposed process, a grouped affineSubblock has a high likely size of 4×N or N×4. Therefore, two pass BDOF refinements that apply to such grouped affineSubblocks may be too complex to justify the coding benefit. Accordingly, this disclosure also describes techniques for reducing complexity associated with affine subblock BDOF refinement and AMVP-merge mode for affine coded block.

In some examples, video encoder 200 and video decoder 300 may be configured to determine whether or not to apply multi-iterative BDOF or one-pass BDOF. In such an example, video decoder 300 may determine whether to refine the MV of a coding block, a subblock of a coding block, or a grouped affineSubblock by applying BDOF process. The block, e.g., a coding block, a subblock of a coding block or a grouped affineSubblock are the input to a BDOF process, and may be referred to herein as bdofInitialBlock. Given a W×H bdofInitialBlock, video decoder 300 may be configured to determine whether to apply multi-iterative BDOF or one-pass BDOF MV refinement by one or a subset of the following conditions:

- When W×H is equal to 4×4, 4×8 or 8×4.
- When W×H is smaller than a TH, where TH is a pre-determined value, e.g., 256.
- When W×H is smaller than a TH, where TH is equal to the threshold of determining that maximum BDOF sub-block size to be 4×4.
- When W is equal or smaller than a TH, e.g., TH is equal to 4.
- When H is equal or smaller than a TH, e.g., TH is equal to 4.
- When W is not integer multiple of 8, e.g., W is equal to 4, 12, 20, 28, 36, 44, . . . 124, 132, . . . 252.
- When H is not integer multiple of 8, e.g., H is equal to 4, 12, 20, 28, 36, 44, . . . 124, 132, . . . 252.
- When an affine coded block, and it has at least two subPu have different MV, e.g., the CU CPMV is not translational CPMV, e.g., at least a CPMV is different to others.
- Some of the above conditions are combined to determine a bdofInitialBlock to do only one-pass BDOF MV refinement.

In some examples, when determining to do one-pass BDOF MV refinement, video decoder 300 may use a maximum BDOF subblock size that is pre-determined to be M×N, e.g., 4×4.

In some examples, when determining to do one-pass BDOF MV refinement, video decoder 300 may adaptively set the maximum BDOF subblock size to M×N, e.g., 4×4 or S×T, e.g., 8×8. For example, when the coding block size is smaller than a threshold, e.g., 1024, the maximum subblock size is set to 4×4, and 8×8 otherwise. For example, when the grouped affineSubblock size is smaller than a threshold, e.g., 256, the maximum subblock size is set to 4×4, and 8×8 otherwise.

In some examples, the process may apply only to an affine coded block, or in other examples, apply to both affine and non-affine coded blocks.

In some examples, video encoder 200 and video decoder 300 may be configured to perform AMVP-merge mode for affine candidate selection. When AMVP-merge mode for affine is applied to a block, the block is predicted by using two MV from two reference pictures. In some examples, the two reference pictures meet the condition of: one reference picture locates to the future relative to the current picture and one reference picture locates to the past relative to the current picture, and the two reference pictures have equal POC distance to the current picture. This may be referred to herein as EqualPocDistDiffDirection condition.

In some examples, affine flag value is determined to be 0 when a coding block is determined to be AMVP-merge mode coded block and the reference pictures in list 0 and list 1 does not have a pair that meeting the condition of EqualPocDistDiffDirection.

In some examples, the number of reference picture index is reduced by checking EqualPocDistDiffDirection. For example, when the current picture have N reference pictures in listX, however, only M reference pictures in listX have a pair reference picture that can meet the condition of EqualPocDistDiffDirection, the number of reference picture index is reduced from N to M when a block is determined to be AMVP-merge for affine coded block. Wherein, listX is indicated by a flag that AMVP predictor is from listX and merge predictor is from list(1−X).

In some examples, the reference picture index is derived to be K when only the K-th reference picture in listX has a paired reference picture in list(1−X) that can meet the condition of EqualPocDistDiffDirection. Wherein, listX is indicated by a flag that AMVP predictor is from listX and merge predictor is from list(1−X).

Figure 16:
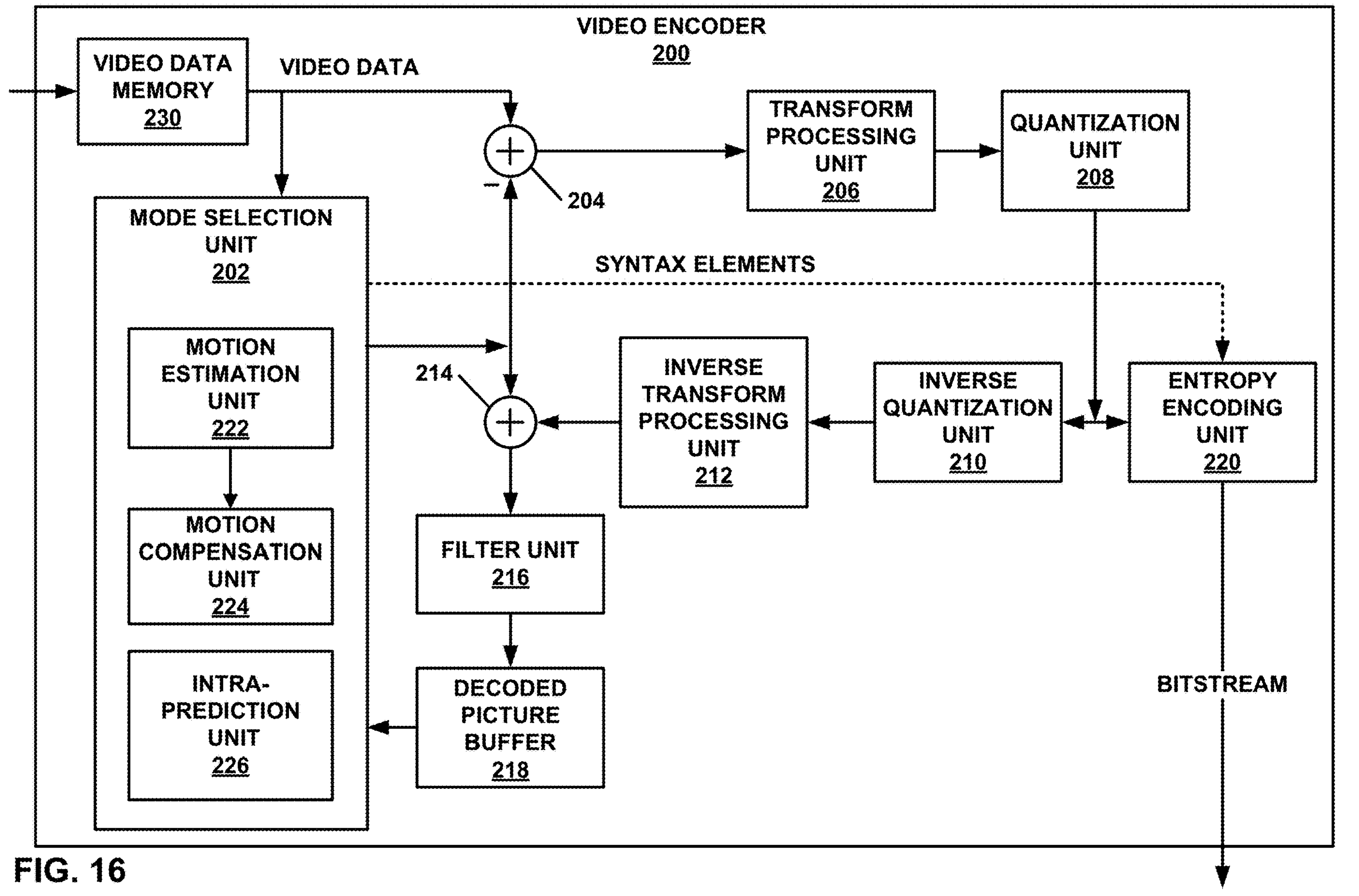
FIG. 16 is a block diagram illustrating an example video encoder that may perform the techniques of this disclosure.

FIG. 16 is a block diagram illustrating an example video encoder 200 that may perform the techniques of this disclosure. FIG. 16 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 16, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 is an example of a memory system that may store video data to be encoded by the components of video encoder 200. Video encoder 200 may receive the video data stored in video data memory 230 from, for example, video source 104 (FIG. 1). DPB 218 is an example of a memory system that may act as a reference picture memory that stores reference video data for use in prediction of subsequent video data by video encoder 200. Video data memory 230 and DPB 218 may each be formed by any of a variety of one or more memory devices or memory units, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 16 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to derive an initial motion vector according to an affine model for a current block; apply bi-directional optical flow subblock motion vector refinement to the initial motion vector to determine a modified motion vector for the current block; determine a prediction block for the current block based on the modified motion vector; and use the prediction block to determine a decoded version of the current block. Video encoder 200 also represents an example of a device configured to encode video data including a memory configured to store video data, and one or more processing units implemented in circuitry and configured to derive an initial motion vector for a current block from a temporally co-located block of the current block; apply bi-directional optical flow subblock motion vector refinement to the initial motion vector to determine a modified motion vector for the current block; determine a prediction block for the current block based on the modified motion vector; and use the prediction block to determine a decoded version of the current block.

Figure 17:
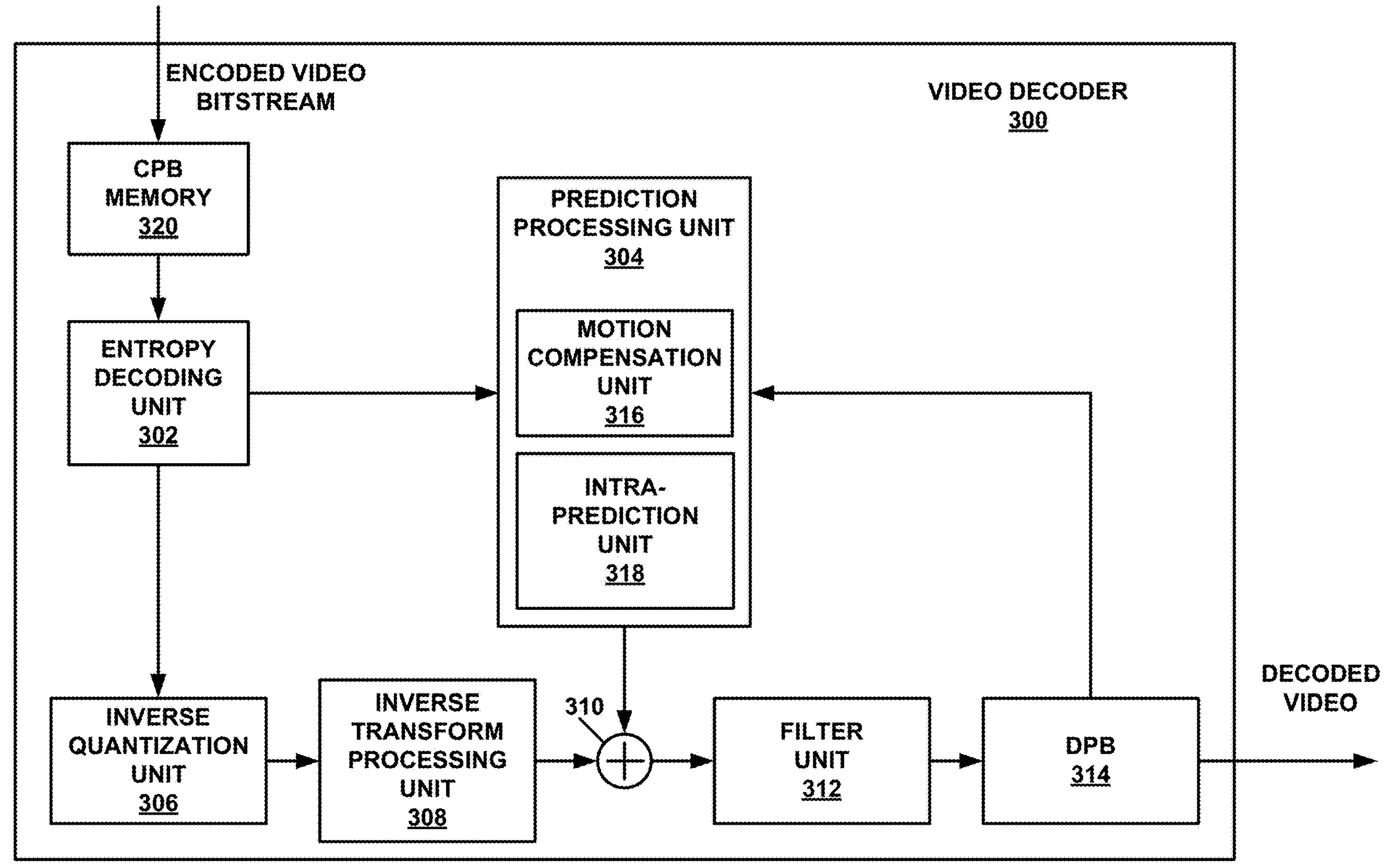
FIG. 17 is a block diagram illustrating an example video decoder that may perform the techniques of this disclosure.

FIG. 17 is a block diagram illustrating an example video decoder 300 that may perform the techniques of this disclosure. FIG. 17 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 17, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 is an example of a memory system that may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 is an example of a memory system that generally stores decoded pictures, which video decoder 300 may output and/or use as reference video data when decoding subsequent data or pictures of the encoded video bitstream. CPB memory 320 and DPB 314 may each be formed by any of a variety of memory devices or memory units, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 17 are illustrated to assist with understanding the operations performed by video decoder 300. The units may be implemented as fixed-function circuits, programmable circuits, or a combination thereof. Similar to FIG. 16, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 16).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 16). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to derive an initial motion vector according to an affine model for a current block; apply bi-directional optical flow subblock motion vector refinement to the initial motion vector to determine a modified motion vector for the current block; determine a prediction block for the current block based on the modified motion vector; and use the prediction block to determine a decoded version of the current block. video decoder 300 represents an example of a video decoding device including a memory configured to store video data, and one or more processing units implemented in circuitry and configured to store video data, and one or more processing units implemented in circuitry and configured to derive an initial motion vector for a current block from a temporally co-located block of the current block; apply bi-directional optical flow subblock motion vector refinement to the initial motion vector to determine a modified motion vector for the current block; determine a prediction block for the current block based on the modified motion vector; and use the prediction block to determine a decoded version of the current block.

Figure 18:
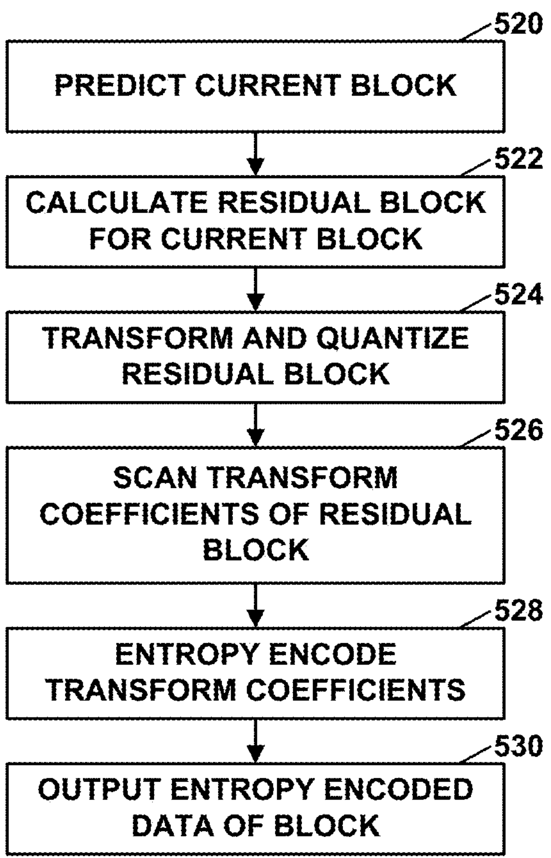
FIG. 18 is a flowchart illustrating an example process for encoding a current block in accordance with the techniques of this disclosure.

FIG. 18 is a flowchart illustrating an example process for encoding a current block in accordance with the techniques of this disclosure. The current block may be or include a current CU. Although described with respect to video encoder 200 (FIGS. 1 and 16), it should be understood that other devices may be configured to perform a process similar to that of FIG. 18.

In this example, video encoder 200 initially predicts the current block (520). For example, video encoder 200 may form a prediction block for the current block. Video encoder 200 may then calculate a residual block for the current block (522). To calculate the residual block, video encoder 200 may calculate a difference between the original, unencoded block and the prediction block for the current block. Video encoder 200 may then transform the residual block and quantize transform coefficients of the residual block (524). Next, video encoder 200 may scan the quantized transform coefficients of the residual block (526). During the scan, or following the scan, video encoder 200 may entropy encode the transform coefficients (528). For example, video encoder 200 may encode the transform coefficients using CAVLC or CABAC. Video encoder 200 may then output the entropy encoded data of the block (530).

Figure 19:
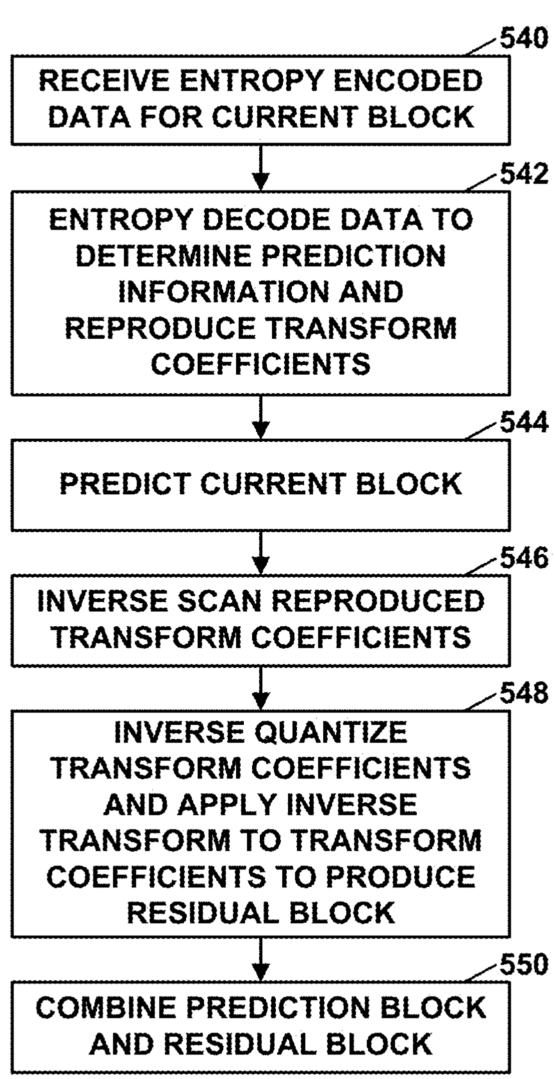
FIG. 19 is a flowchart illustrating an example process for decoding a current block in accordance with the techniques of this disclosure.

FIG. 19 is a flowchart illustrating an example process for decoding a current block of video data in accordance with the techniques of this disclosure. The current block may be or include a current CU. Although described with respect to video decoder 300 (FIGS. 1 and 17), it should be understood that other devices may be configured to perform a process similar to that of FIG. 19.

Video decoder 300 may receive entropy encoded data for the current block, such as entropy encoded prediction information and entropy encoded data for transform coefficients of a residual block corresponding to the current block (540). Video decoder 300 may entropy decode the entropy encoded data to determine prediction information for the current block and to reproduce transform coefficients of the residual block (542). Video decoder 300 may predict the current block (544), e.g., using an intra- or inter-prediction mode as indicated by the prediction information for the current block, to calculate a prediction block for the current block. Video decoder 300 may then inverse scan the reproduced transform coefficients (546), to create a block of quantized transform coefficients. Video decoder 300 may then inverse quantize the transform coefficients and apply an inverse transform to the transform coefficients to produce a residual block (548). Video decoder 300 may ultimately decode the current block by combining the prediction block and the residual block (550).

Figure 20:
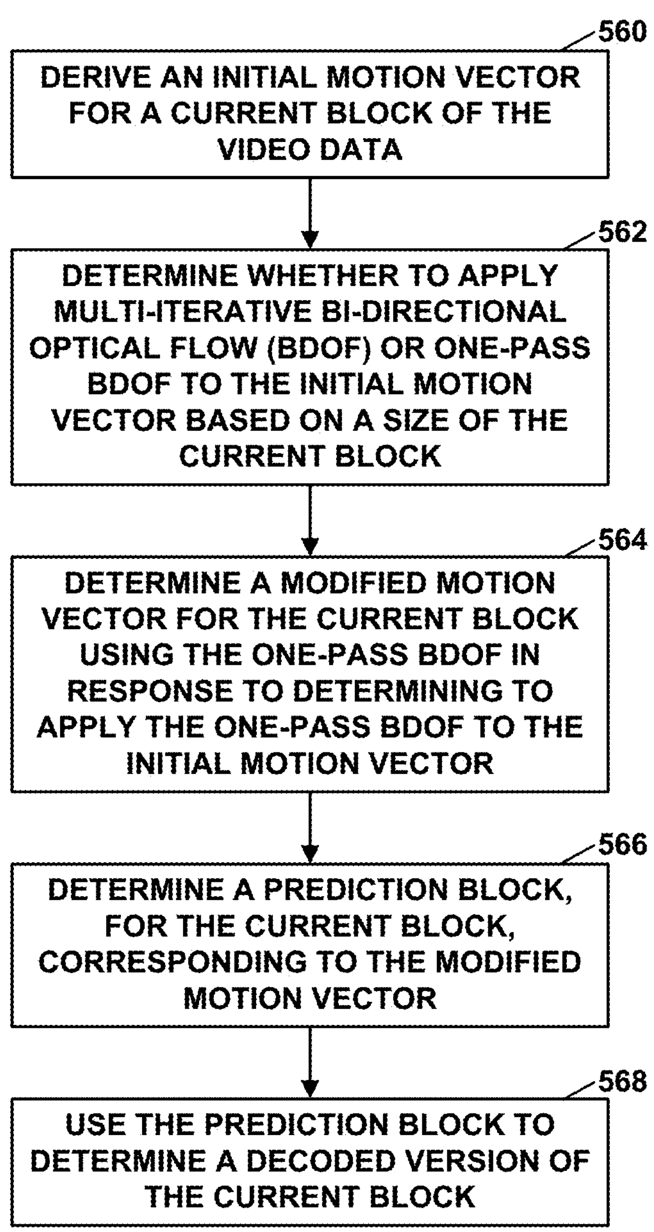
FIG. 20 is a flowchart illustrating an example process for decoding a current block in accordance with the techniques of this disclosure.

FIG. 20 is a flowchart illustrating an example process for decoding a current block of video data in accordance with the techniques of this disclosure. The current block may be or include a current CU. Although described with respect to video decoder 300 (FIGS. 1 and 17), it should be understood that other devices may be configured to perform a process similar to that of FIG. 20.

In the example of FIG. 20, video decoder 300 derives an initial motion vector for a current block of the video data (560). Video decoder 300 determines whether to apply multi-iterative bi-directional optical flow (BDOF) or one-pass BDOF to the initial motion vector based on a size of the current block (562). For example, the video decoding loop of video encoder 200 may also perform the techniques of FIG. 20.

To determine whether to apply the multi-iterative BDOF or the one-pass BDOF to the initial motion vector based on the size of the current block, video decoder 300 may, for example, be configured to determine to apply the one-pass BDOF to the initial motion vector in response to a width of the block not being an integer multiple of 8. To determine whether to apply the multi-iterative BDOF or the one-pass BDOF to the initial motion vector based on the size of the current block, video decoder 300 may, for example, be configured to determine to apply the one-pass BDOF to the initial motion vector in response to a height of the block not being an integer multiple of 8. To determine whether to apply the multi-iterative BDOF or the one-pass BDOF to the initial motion vector based on the size of the current block, video decoder 300 may, for example, be configured to determine to apply the one-pass BDOF to the initial motion vector in response to a width of the block being equal to 4. To determine whether to apply the multi-iterative BDOF or the one-pass BDOF to the initial motion vector based on the size of the current block, video decoder 300 may, for example, be configured to determine to apply the one-pass BDOF to the initial motion vector in response to a height of the block being equal to 4. To determine whether to apply the multi-iterative BDOF or the one-pass BDOF to the initial motion vector based on the size of the current block, video decoder 300 may, for example, be configured to determine to apply the one-pass BDOF to the initial motion vector in response to a size of the current block being one of 4×4, 4×8 or 8×4.

Video decoder 300 determines a modified motion vector for the current block using the one-pass BDOF in response to determining to apply the one-pass BDOF to the initial motion vector (564). Video decoder 300 determines a prediction block, for the current block, corresponding to the modified motion vector (566). Video decoder 300 may also store the modified motion vector for use in decoding a subsequent block of video data.

Video decoder 300 uses the prediction block to determine a decoded version of the current block (568). Video decoder 300 may, for example, output a decoded picture that includes the decoded version of the current block. Video decoder 300 may, for example, output the decoded picture for display, transmission, or storage. When the process of FIG. 20 is being performed as part of a video encoding process, the decoded picture may be stored for use in encoding other pictures of video data.

The following numbered clauses illustrate one or more aspects of the devices and techniques described in this disclosure.

Clause 1A: A method of coding video data, the method comprising: deriving an initial motion vector according to an affine model for a current block; determining whether to apply multi-iterative bi-directional optical flow (BDOF) or one-pass BDOF to the initial motion vector; in response to determining to apply the one-pass BDOF to the initial motion vector, determining a modified motion vector for the current block using the one-pass BDOF; determining a prediction block for the current block based on the modified motion vector; and using the prediction block to determine a decoded version of the current block.

Clause 2A: A method of coding video data, the method comprising: deriving an initial motion vector for a current block from a temporally co-located block of the current block; determining whether to apply multi-iterative bi-directional optical flow (BDOF) or one-pass BDOF to the initial motion vector; in response to determining to apply the one-pass BDOF to the initial motion vector, determining a modified motion vector for the current block using the one-pass BDOF; determining a prediction block for the current block based on the modified motion vector; and using the prediction block to determine a decoded version of the current block.

Clause 3A: The method of clause 1A or 2A, wherein block has a width (W) and a height (H) and determining to apply the one-pass BDOF to the initial motion vector comprises determining to apply the one-pass BDOF to the initial motion vector in response to one or more of: a size of the block being equal to 4×4, 4×8A or 8×4. W×H being smaller than a threshold (TH), where TH is a pre-determined value; W×H being smaller than TH, where TH is equal to the threshold of determining a maximum BDOF subblock size to be 4×4; W being equal to or smaller than a TH; H being equal to or smaller than TH; W not being an integer multiple of 8; H not being an integer multiple of 8; or the block being an affine coded block that has at least two sub-prediction units that have different motion vectors.

Clause 4A: A method of coding video data, the method comprising: determining that a block of video data in a current picture is encoded in an advanced motion vector prediction (AMVP) mode; maintaining an AMVP candidate list for the block; determining that the AMVP candidate list does not include two candidates with equal picture order count (POC) distances with respect to the current picture, wherein a POC distance correspond to a magnitude of a difference between a POC value of a reference picture for a candidate and a POC value of the current picture; in response to determining that the AMVP candidate list does not include the two candidates with equal POC distances, determining that affine prediction is disabled for the block of video data.

Clause 5A: A method of coding video data, the method comprising: determining that a block of video data in a current picture is encoded in an advanced motion vector prediction (AMVP) mode; maintaining an AMVP candidate list for the block; determining that all candidates in the AMVP candidate list have different picture order count (POC) distances with respect to the current picture, wherein a POC distance corresponds to a magnitude of a difference between a POC value of a reference picture for a candidate and a POC value of the current picture; and in response to determining that all candidates in the AMVP candidate list have different POC distances with respect to the current picture, determining that affine prediction is disabled for the block of video data.

Clause 6A: The method of clauses 4A or 5A, wherein determining that the affine prediction is disabled for the block of video data comprises inferring the value of a syntax element to be set to a value without receiving an instance of the syntax element in a bitstream comprising the video data.

Clause 7A: The method of any of clauses 1A-6A, wherein coding comprises decoding.

Clause 8A: The method of any of clauses 1A-7A, wherein coding comprises encoding.

Clause 9A: A device for coding video data, the device comprising one or more means for performing the method of any of clauses 1A-8A.

Clause 10A: The device of clause 9A, wherein the one or more means comprise one or more processors implemented in circuitry.

Clause 11A: The device of any of clauses 9A and 10A, further comprising a memory to store the video data.

Clause 12A: The device of any of clauses 9A-11A, further comprising a display configured to display decoded video data.

Clause 13A: The device of any of clauses 9A-12A, wherein the device comprises one or more of a camera, a computer, a mobile device, a broadcast receiver device, or a set-top box.

Clause 14A: The device of any of clauses 9A-13A, wherein the device comprises a video decoder.

Clause 15A: The device of any of clauses 9A-14A, wherein the device comprises a video encoder.

Clause 16A: A computer-readable storage medium having stored thereon instructions that, when executed, cause one or more processors to perform the method of any of clauses 1A-8A.

Clause 1B: A method of decoding video data, the method comprising: deriving an initial motion vector for a current block of the video data; determining whether to apply multi-iterative bi-directional optical flow (BDOF) or one-pass BDOF to the initial motion vector based on a size of the current block; in response to determining to apply the one-pass BDOF to the initial motion vector, determining a modified motion vector for the current block using the one-pass BDOF; determining a prediction block, for the current block, corresponding to the modified motion vector; and using the prediction block to determine a decoded version of the current block.

Clause 2B: The method of clause 1B, wherein determining whether to apply the multi-iterative BDOF or the one-pass BDOF to the initial motion vector based on the size of the current block comprises determining to apply the one-pass BDOF to the initial motion vector in response to a width of the block not being an integer multiple of 8.

Clause 3B: The method of clause 1B or 2B, wherein determining whether to apply the multi-iterative BDOF or the one-pass BDOF to the initial motion vector based on the size of the current block comprises determining to apply the one-pass BDOF to the initial motion vector in response to a height of the block not being an integer multiple of 8.

Clause 4B: The method of clause 1B, wherein determining whether to apply the multi-iterative BDOF or the one-pass BDOF to the initial motion vector based on the size of the current block comprises determining to apply the one-pass BDOF to the initial motion vector in response to a width of the block being equal to 4.

Clause 5B: The method of clause 1B or 4B, wherein determining whether to apply the multi-iterative BDOF or the one-pass BDOF to the initial motion vector based on the size of the current block comprises determining to apply the one-pass BDOF to the initial motion vector in response to a height of the block being equal to 4.

Clause 6B: The method of clause 1B, wherein determining whether to apply the multi-iterative BDOF or the one-pass BDOF to the initial motion vector based on the size of the current block comprises determining to apply the one-pass BDOF to the initial motion vector in response to a size of the current block being one of 4×4, 4×8, or 8×4.

Clause 7B: The method of any of clauses 1B-6B, further comprising: storing the modified motion vector for use in decoding a subsequent block of video data.

Clause 8B: The method of any of clauses 1B-7B, wherein the current block comprises an affine coded block.

Clause 9B: The method of any of clauses 1B-8B, wherein the method of decoding is performed as part of a video encoding process.

Clause 10B: A device for decoding video data, the device comprising: a memory configured to store video data; one or more processors implemented in circuitry and configured to: derive an initial motion vector for a current block of the video data; determine whether to apply multi-iterative bi-directional optical flow (BDOF) or one-pass BDOF to the initial motion vector based on a size of the current block; in response to determining to apply the one-pass BDOF to the initial motion vector, determine a modified motion vector for the current block using the one-pass BDOF; determine a prediction block, for the current block, corresponding to the modified motion vector; and use the prediction block to determine a decoded version of the current block.

Clause 11B: The device of clause 10B, wherein to determine whether to apply the multi-iterative BDOF or the one-pass BDOF to the initial motion vector based on the size of the current block, the one or more processors are further configured to determine to apply the one-pass BDOF to the initial motion vector in response to a width of the block not being an integer multiple of 8.

Clause 12B: The device of clause 10B or 11B, wherein to determine whether to apply the multi-iterative BDOF or the one-pass BDOF to the initial motion vector based on the size of the current block, the one or more processors are further configured to determine to apply the one-pass BDOF to the initial motion vector in response to a height of the block not being an integer multiple of 8.

Clause 13B: The device of clause 10B, wherein to determine whether to apply the multi-iterative BDOF or the one-pass BDOF to the initial motion vector based on the size of the current block, the one or more processors are further configured to determine to apply the one-pass BDOF to the initial motion vector in response to a width of the block being equal to 4.

Clause 14B: The device of clause 10B or 13B, wherein to determine whether to apply the multi-iterative BDOF or the one-pass BDOF to the initial motion vector based on the size of the current block, the one or more processors are further configured to determine to apply the one-pass BDOF to the initial motion vector in response to a height of the block being equal to 4.

Clause 15B: The device of clause 10B, wherein to determine whether to apply the multi-iterative BDOF or the one-pass BDOF to the initial motion vector based on the size of the current block, the one or more processors are further configured to determine to apply the one-pass BDOF to the initial motion vector in response to a size of the current block being one of 4×4, 4×8B or 8×4.

Clause 16B: The device of any of clauses 10B-15B, wherein the one or more processors are further configured to: store the modified motion vector for use in decoding a subsequent block of video data.

Clause 17B: The device of any of clauses 10B-16B, wherein the current block comprises an affine coded block.

Clause 18B: The device of any of clauses 10B-17B, further comprising a display configured to display decoded video data.

Clause 19B: The device of any of clauses 10B-18B, wherein the device comprises one or more of a camera, a computer, a mobile device, a broadcast receiver device, or a set-top box.

Clause 20B: The device of any of clauses 10B-19B, wherein the device comprises a video decoder.

Clause 21B: The device of any of clauses 10B-19B, wherein the device comprises a video encoder.

Clause 22B: A computer-readable storage medium storing instructions that when executed by one or more processors cause the one or more processors to: derive an initial motion vector for a current block of video data; determine whether to apply multi-iterative bi-directional optical flow (BDOF) or one-pass BDOF to the initial motion vector based on a size of the current block; in response to determining to apply the one-pass BDOF to the initial motion vector, determine a modified motion vector for the current block using the one-pass BDOF; determine a prediction block, for the current block, corresponding to the modified motion vector; and use the prediction block to determine a decoded version of the current block.

Clause 23B: A device for encoding video data, the device comprising: a memory configured to store video data; one or more processors implemented in circuitry and configured to: derive an initial motion vector for a current block of the video data; determine whether to apply multi-iterative bi-directional optical flow (BDOF) or one-pass BDOF to the initial motion vector based on a size of the current block; in response to determining to apply the one-pass BDOF to the initial motion vector, determine a modified motion vector for the current block using the one-pass BDOF; determine a prediction block, for the current block, corresponding to the modified motion vector; use the prediction block to determine a decoded version of the current block; storing, in a decoded picture buffer, a copy of a decoded picture of video data that includes the decoded version of the current block; and predicting a subsequent block of the video data using the stored copy of the decoded picture of the video data.

Clause 24B: The device of clause 23B, wherein to determine whether to apply the multi-iterative BDOF or the one-pass BDOF to the initial motion vector based on the size of the current block, the one or more processors are further configured to determine to apply the one-pass BDOF to the initial motion vector in response to a width of the block not being an integer multiple of 8.

Clause 25B: The device of clause 23B or 24B, wherein to determine whether to apply the multi-iterative BDOF or the one-pass BDOF to the initial motion vector based on the size of the current block, the one or more processors are further configured to determine to apply the one-pass BDOF to the initial motion vector in response to a height of the block not being an integer multiple of 8.

Clause 26B: The device of clause 23B, wherein to determine whether to apply the multi-iterative BDOF or the one-pass BDOF to the initial motion vector based on the size of the current block, the one or more processors are further configured to determine to apply the one-pass BDOF to the initial motion vector in response to a width of the block being equal to 4.

Clause 27B: The device of clause 23B or 26B, wherein to determine whether to apply the multi-iterative BDOF or the one-pass BDOF to the initial motion vector based on the size of the current block, the one or more processors are further configured to determine to apply the one-pass BDOF to the initial motion vector in response to a height of the block being equal to 4.

Clause 28B: The device of clause 23B, wherein to determine whether to apply the multi-iterative BDOF or the one-pass BDOF to the initial motion vector based on the size of the current block, the one or more processors are further configured to determine to apply the one-pass BDOF to the initial motion vector in response to a size of the current block being one of 4×4, 4×8B or 8×4.

Clause 29B: The device of any of clauses 23B-28B, wherein the one or more processors are further configured to: store the modified motion vector for use in decoding a subsequent block of video data.

Clause 30B: The device of any of clauses 23B-29B, wherein the current block comprises an affine coded block.

Clause 1C: A method of decoding video data, the method comprising: deriving an initial motion vector for a current block of the video data; determining to apply one-pass bi-directional optical flow (BDOF) based on a size of the current block; in response to determining to apply the one-pass BDOF to the initial motion vector, determining a modified motion vector for the current block using the one-pass BDOF; determining a prediction block, for the current block, corresponding to the modified motion vector; and using the prediction block to determine a decoded version of the current block.

Clause 2C: The method of clause 1C, wherein determining to apply the one-pass BDOF to the initial motion vector based on the size of the current block comprises: determining whether to apply multi-iterative BDOF or the one-pass BDOF to the initial motion vector based on the size of the current block; and determining to apply the one-pass BDOF to the initial motion vector in response to a width of the block not being an integer multiple of 8.

Clause 3C: The method of clause 1C or 2C, wherein determining to apply the one-pass BDOF to the initial motion vector based on the size of the current block comprises: determining whether to apply multi-iterative BDOF or the one-pass BDOF to the initial motion vector based on the size of the current block; and determining to apply the one-pass BDOF to the initial motion vector in response to a height of the block not being an integer multiple of 8.

Clause 4C: The method of clause 1C, wherein determining to apply the one-pass BDOF to the initial motion vector based on the size of the current block comprises: determining whether to apply multi-iterative BDOF or the one-pass BDOF to the initial motion vector based on the size of the current block; and determining to apply the one-pass BDOF to the initial motion vector in response to a width of the block being equal to 4.

Clause 5C: The method of clause 1C or 4C, wherein determining to apply the one-pass BDOF to the initial motion vector based on the size of the current block comprises: determining whether to apply multi-iterative BDOF or the one-pass BDOF to the initial motion vector based on the size of the current block; and determining to apply the one-pass BDOF to the initial motion vector in response to a height of the block being equal to 4.

Clause 6C: The method of clause 1C, wherein determining to apply the one-pass BDOF to the initial motion vector based on the size of the current block comprises: determining whether to apply multi-iterative BDOF or the one-pass BDOF to the initial motion vector based on the size of the current block; and determining to apply the one-pass BDOF to the initial motion vector in response to a size of the current block being one of 4×4, 4×8B or 8×4.

Clause 7C: The method of any of clauses 1C-6C, further comprising: storing the modified motion vector for use in decoding a subsequent block of video data.

Clause 8C: The method of any of clauses 1C-7C, wherein the current block comprises an affine coded block.

Clause 9C: The method of any of clauses 1C-8C, wherein the method of decoding is performed as part of a video encoding process.

Clause 10C: A device for decoding video data, the device comprising: a memory configured to store video data; one or more processors implemented in circuitry and configured to: derive an initial motion vector for a current block of the video data; determine to apply one-pass bi-directional optical flow (BDOF) to the initial motion vector based on a size of the current block; in response to determining to apply the one-pass BDOF to the initial motion vector, determine a modified motion vector for the current block using the one-pass BDOF; determine a prediction block, for the current block, corresponding to the modified motion vector; and use the prediction block to determine a decoded version of the current block.

Clause 11C: The device of clause 10C, wherein to determine to apply the one-pass BDOF to the initial motion vector based on the size of the current block, the one or more processors are further configured to: determine whether to apply multi-iterative BDOF or the one-pass BDOF to the initial motion vector based on the size of the current block; and determine to apply the one-pass BDOF to the initial motion vector in response to a width of the block not being an integer multiple of 8.

Clause 12C: The device of clause 10C or 11C, wherein to determine to apply the one-pass BDOF to the initial motion vector based on the size of the current block, the one or more processors are further configured to: determine whether to apply multi-iterative BDOF or the one-pass BDOF to the initial motion vector based on the size of the current block; and determine to apply the one-pass BDOF to the initial motion vector in response to a height of the block not being an integer multiple of 8.

Clause 13C: The device of clause 10C, wherein to determine to apply the one-pass BDOF to the initial motion vector based on the size of the current block, the one or more processors are further configured to: determine whether to apply multi-iterative BDOF or the one-pass BDOF to the initial motion vector based on the size of the current block; and determine to apply the one-pass BDOF to the initial motion vector in response to a width of the block being equal to 4.

Clause 14C: The device of clause 10C or 13C, wherein to determine to apply the one-pass BDOF to the initial motion vector based on the size of the current block, the one or more processors are further configured to: determine whether to apply multi-iterative BDOF or the one-pass BDOF to the initial motion vector based on the size of the current block; and determine to apply the one-pass BDOF to the initial motion vector in response to a height of the block being equal to 4.

Clause 15C: The device of clause 10C, wherein to determine to apply the one-pass BDOF to the initial motion vector based on the size of the current block, the one or more processors are further configured to: determine whether to apply multi-iterative BDOF or the one-pass BDOF to the initial motion vector based on the size of the current block; and determine to apply the one-pass BDOF to the initial motion vector in response to a size of the current block being one of 4×4, 4×8B or 8×4.

Clause 16C: The device of any of clauses 10C-16C, wherein the one or more processors are further configured to: store the modified motion vector for use in decoding a subsequent block of video data.

Clause 17C: The device of any of clauses 10C-17C, wherein the current block comprises an affine coded block.

Clause 18C: The device of any of clauses 10C-17C, further comprising a display configured to display decoded video data.

Clause 19C: The device of any of clauses 10C-18C, wherein the device comprises one or more of a camera, a computer, a mobile device, a broadcast receiver device, or a set-top box.

Clause 20C: The device of any of clauses 10C-19C, wherein the device comprises a video decoder.

Clause 21C: The device of any of clauses 10C-19C, wherein the device comprises a video encoder.

Clause 22C: A computer-readable storage medium storing instructions that when executed by one or more processors cause the one or more processors to: derive an initial motion vector for a current block of video data; determine to apply one-pass BDOF to the initial motion vector based on a size of the current block; in response to determining to apply the one-pass BDOF to the initial motion vector, determine a modified motion vector for the current block using the one-pass BDOF; determine a prediction block, for the current block, corresponding to the modified motion vector; and use the prediction block to determine a decoded version of the current block.

Clause 23C: A device for encoding video data, the device comprising: a memory configured to store video data; one or more processors implemented in circuitry and configured to: derive an initial motion vector for a current block of the video data; determine to apply one-pass bi-directional optical flow (BDOF) to the initial motion vector based on a size of the current block; in response to determining to apply the one-pass BDOF to the initial motion vector, determine a modified motion vector for the current block using the one-pass BDOF; determine a prediction block, for the current block, corresponding to the modified motion vector; use the prediction block to determine a decoded version of the current block; store, in a decoded picture buffer, a copy of a decoded picture of video data that includes the decoded version of the current block; and predict a subsequent block of the video data using the stored copy of the decoded picture of the video data.

Clause 24C: The device of clause 23C, wherein to determine to apply the one-pass BDOF to the initial motion vector based on the size of the current block, the one or more processors are further configured to: determine whether to apply multi-iterative BDOF or the one-pass BDOF to the initial motion vector based on the size of the current block; and determine to apply the one-pass BDOF to the initial motion vector in response to a width of the block not being an integer multiple of 8.

Clause 25C: The device of clause 23C or 24C, wherein to determine to apply the one-pass BDOF to the initial motion vector based on the size of the current block, the one or more processors are further configured to: determine whether to apply multi-iterative BDOF or the one-pass BDOF to the initial motion vector based on the size of the current block; and determine to apply the one-pass BDOF to the initial motion vector in response to a height of the block not being an integer multiple of 8.

Clause 26C: The device of clause 23C, wherein to determine to apply the one-pass BDOF to the initial motion vector based on the size of the current block, the one or more processors are further configured to: determine whether to apply multi-iterative BDOF or the one-pass BDOF to the initial motion vector based on the size of the current block; and determine to apply the one-pass BDOF to the initial motion vector in response to a width of the block being equal to 4.

Clause 27C: The device of clause 23C or 26C, wherein to determine to apply the one-pass BDOF to the initial motion vector based on the size of the current block, the one or more processors are further configured to: determine whether to apply multi-iterative BDOF or the one-pass BDOF to the initial motion vector based on the size of the current block; and determine to apply the one-pass BDOF to the initial motion vector in response to a height of the block being equal to 4.

Clause 28C: The device of clause 23C, wherein to determine to apply the one-pass BDOF to the initial motion vector based on the size of the current block, the one or more processors are further configured to: determine whether to apply multi-iterative BDOF or the one-pass BDOF to the initial motion vector based on the size of the current block; and determine to apply the one-pass BDOF to the initial motion vector in response to a size of the current block being one of 4×4, 4×8B or 8×4.

Clause 29C: The device of any of clauses 23C-28C, wherein the current block comprises an affine coded block.

Clause 30C: The device of any of clauses 23C-29C, wherein the device comprises one or more of a camera, a computer, or a mobile device.

Clause 31C: A method of encoding video data, the method comprising: deriving an initial motion vector for a current block of the video data; determining to apply one-pass bi-directional optical flow (BDOF) to the initial motion vector based on a size of the current block; in response to determining to apply the one-pass BDOF to the initial motion vector, determining a modified motion vector for the current block using the one-pass BDOF; determining a prediction block, for the current block, corresponding to the modified motion vector; using the prediction block to determine a decoded version of the current block; storing, in a decoded picture buffer, a copy of a decoded picture of video data that includes the decoded version of the current block; and predicting a subsequent block of the video data using the stored copy of the decoded picture of the video data.

Clause 32C: The method of clause 31C, wherein determining to apply the one-pass BDOF to the initial motion vector based on the size of the current block comprises: determine whether to apply multi-iterative BDOF or the one-pass BDOF to the initial motion vector based on the size of the current block; and determine to apply the one-pass BDOF to the initial motion vector in response to a height or width of the block not being an integer multiple of 8.

Clause 33C: The method of clause 31C, wherein determining to apply the one-pass BDOF to the initial motion vector based on the size of the current block comprises: determine whether to apply multi-iterative BDOF or the one-pass BDOF to the initial motion vector based on the size of the current block; and determine to apply the one-pass BDOF to the initial motion vector in response to a height or width of the block being equal to 4.

Clause 34C: The method of clause 31C, wherein determining to apply the one-pass BDOF to the initial motion vector based on the size of the current block comprises: determine whether to apply multi-iterative BDOF or the one-pass BDOF to the initial motion vector based on the size of the current block; and determine to apply the one-pass BDOF to the initial motion vector in response to a size of the current block being one of 4×4, 4×8B or 8×4.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

deriving an initial motion vector for a current block of the video data;

determining to apply one-pass bi-directional optical flow (BDOF) based on a size of the current block, wherein determining to apply the one-pass BDOF to the initial motion vector based on the size of the current block comprises:

determining whether to apply multi-iterative BDOF or the one-pass BDOF to the initial motion vector based on one or both of a height and a width of the current block; and determining to apply the one-pass BDOF to the initial motion vector in response to one or both of the height and the width of the current block not being an integer multiple of 8;

in response to determining to apply the one-pass BDOF to the initial motion vector, determining a modified motion vector for the current block using the one-pass BDOF;

determining a prediction block, for the current block, corresponding to the modified motion vector; and using the prediction block to determine a decoded version of the current block.

2. The method of claim 1, wherein determining to apply the one-pass BDOF to the initial motion vector based on the size of the current block comprises:

determining to apply the one-pass BDOF to the initial motion vector in response to the width of the block being equal to 4.

3. The method of claim 1, wherein determining to apply the one-pass BDOF to the initial motion vector based on the size of the current block comprises:

determining to apply the one-pass BDOF to the initial motion vector in response to the height of the block being equal to 4.

4. The method of claim 1, wherein determining to apply the one-pass BDOF to the initial motion vector based on the size of the current block comprises:

determining to apply the one-pass BDOF to the initial motion vector in response to the size of the current block being one of 4×4, 4×8 or 8×4.

5. The method of claim 1, further comprising:

storing the modified motion vector for use in decoding a subsequent block of video data.

6. The method of claim 1, wherein the current block comprises an affine coded block.

7. The method of claim 1, wherein the method of decoding is performed as part of a video encoding process.

8. The method of claim 1, further comprising:

adaptively selecting between a maximum BDOF subblock size of 4×4 and a maximum BDOF subblock size of 8×8 based on a size of the current block.

9. The method of claim 8, wherein adaptively selecting between the maximum BDOF subblock size of 4×4 and the maximum BDOF subblock size of 8×8 based on the size of the current block comprises:

selecting the maximum BDOF subblock size of 8×8 in response to size of the current block being greater than or equal to a threshold.

10. A device for decoding video data, the device comprising:

a memory configured to store video data;

one or more processors implemented in circuitry and configured to:

derive an initial motion vector for a current block of the video data;

determine to apply one-pass bi-directional optical flow (BDOF) to the initial motion vector based on a size of the current block, wherein to determine to apply the one-pass BDOF to the initial motion vector based on the size of the current block, the one or more processors are configured to:

determine whether to apply multi-iterative BDOF or the one-pass BDOF to the initial motion vector based on one or both of a height and a width of the current block; and determine to apply the one-pass BDOF to the initial motion vector in response to one or both of the height and the width of the current block not being an integer multiple of 8;

in response to determining to apply the one-pass BDOF to the initial motion vector, determine a modified motion vector for the current block using the one-pass BDOF;

determine a prediction block, for the current block, corresponding to the modified motion vector; and use the prediction block to determine a decoded version of the current block.

11. The device of claim 10, wherein to determine to apply the one-pass BDOF to the initial motion vector based on the size of the current block, the one or more processors are further configured to:

determine to apply the one-pass BDOF to the initial motion vector in response to the width of the block being equal to 4.

12. The device of claim 10, wherein to determine to apply the one-pass BDOF to the initial motion vector based on the size of the current block, the one or more processors are further configured to:

determine to apply the one-pass BDOF to the initial motion vector in response to the height of the block being equal to 4.

13. The device of claim 10, wherein to determine to apply the one-pass BDOF to the initial motion vector based on the size of the current block, the one or more processors are further configured to:

determine to apply the one-pass BDOF to the initial motion vector in response to the size of the current block being one of 4×4, 4×8 or 8×4.

14. The device of claim 10, wherein the one or more processors are further configured to:

store the modified motion vector for use in decoding a subsequent block of video data.

15. The device of claim 10, wherein the current block comprises an affine coded block.

16. The device of claim 10, wherein the device comprises one or more of a camera, a computer, a mobile device, a broadcast receiver device, or a set-top box.

17. The device of claim 10, wherein the one or more processors are further configured to adaptively select between a maximum BDOF subblock size of 4×4 and a maximum BDOF subblock size of 8×8 based on a size of the current block.

18. The device of claim 17, wherein to adaptively select between the maximum BDOF subblock size of 4×4 and the maximum BDOF subblock size of 8×8 based on the size of the current block, the one or more processors are configured to:

select the maximum BDOF subblock size of 8×8 in response to size of the current block being greater than or equal to a threshold.

19. A method of encoding video data, the method comprising:

deriving an initial motion vector for a current block of the video data;

determining to apply one-pass bi-directional optical flow (BDOF) to the initial motion vector based on a size of the current block, wherein determining to apply the one-pass BDOF to the initial motion vector based on the size of the current block comprises:

determining whether to apply multi-iterative BDOF or the one-pass BDOF to the initial motion vector based on one or both of a height and a width of the current block; and determining to apply the one-pass BDOF to the initial motion vector in response to one or both of the height and the width of the current block not being an integer multiple of 8;

in response to determining to apply the one-pass BDOF to the initial motion vector, determining a modified motion vector for the current block using the one-pass BDOF;

determining a prediction block, for the current block, corresponding to the modified motion vector;

using the prediction block to determine a decoded version of the current block;

storing, in a decoded picture buffer, a copy of a decoded picture of video data that includes the decoded version of the current block; and predicting a subsequent block of the video data using the stored copy of the decoded picture of the video data.

20. The method of claim 19, wherein determining to apply the one-pass BDOF to the initial motion vector based on the size of the current block comprises:

determine to apply the one-pass BDOF to the initial motion vector in response to the size of the current block being one of 4×4, 4×8 or 8×4.

21. The method of claim 19, further comprising:

adaptively selecting between a maximum BDOF subblock size of 4×4 and a maximum BDOF subblock size of 8×8 based on a size of the current block.

22. The method of claim 21, wherein adaptively selecting between the maximum BDOF subblock size of 4×4 and the maximum BDOF subblock size of 8×8 based on the size of the current block comprises:

selecting the maximum BDOF subblock size of 8×8 in response to size of the current block being greater than or equal to a threshold.

23. A device for encoding video data, the device comprising:

a memory configured to store video data;

one or more processors implemented in circuitry and configured to:

derive an initial motion vector for a current block of the video data;

determine to apply one-pass bi-directional optical flow (BDOF) to the initial motion vector based on a size of the current block, wherein to determine to apply the one-pass BDOF to the initial motion vector based on the size of the current block, the one or more processors are configured to:

determine whether to apply multi-iterative BDOF or the one-pass BDOF to the initial motion vector based on one or both of a height and a width of the current block; and determine to apply the one-pass BDOF to the initial motion vector in response to one or both of the height and the width of the current block not being an integer multiple of 8;

in response to determining to apply the one-pass BDOF to the initial motion vector, determine a modified motion vector for the current block using the one-pass BDOF;

determine a prediction block, for the current block, corresponding to the modified motion vector;

use the prediction block to determine a decoded version of the current block;

store, in a decoded picture buffer, a copy of a decoded picture of video data that includes the decoded version of the current block; and predict a subsequent block of the video data using the stored copy of the decoded picture of the video data.

24. The device of claim 23, wherein to determine to apply the one-pass BDOF to the initial motion vector based on the size of the current block, the one or more processors are further configured to:

determine to apply the one-pass BDOF to the initial motion vector in response to a width of the block being equal to 4.

25. The device of claim 23, wherein to determine to apply the one-pass BDOF to the initial motion vector based on the size of the current block, the one or more processors are further configured to:

determine to apply the one-pass BDOF to the initial motion vector in response to a height of the block being equal to 4.

26. The device of claim 23, wherein to determine to apply the one-pass BDOF to the initial motion vector based on the size of the current block, the one or more processors are further configured to:

determine to apply the one-pass BDOF to the initial motion vector in response to a size of the current block being one of 4×4, 4×8 or 8×4.

27. The device of claim 23, wherein the current block comprises an affine coded block.

28. The device of claim 23, wherein the device comprises one or more of a camera, a computer, or a mobile device.

29. The device of claim 23, wherein the one or more processors are further configured to adaptively select between a maximum BDOF subblock size of 4×4 and a maximum BDOF subblock size of 8×8 based on a size of the current block.

30. The device of claim 29, wherein to adaptively select between the maximum BDOF subblock size of 4×4 and the maximum BDOF subblock size of 8×8 based on the size of the current block, the one or more processors are configured to:

select the maximum BDOF subblock size of 8×8 in response to size of the current block being greater than or equal to a threshold.

* * * * *